(12) United States Patent
Muraoka et al.

(10) Patent No.: US 7,435,396 B2
(45) Date of Patent: Oct. 14, 2008

(54) HIGH-PRESSURE PROCESSING APPARATUS AND HIGH-PRESSURE PROCESSING METHOD

(75) Inventors: Yusuke Muraoka, Koyoto (JP); Tomomi Iwata, Kyoto (JP); Kimitsugu Saito, Kyoto (JP); Masahiro Yamagata, Hyogo (JP); Yoichi Inoue, Hyogo (JP); Hisanori Oshiba, Hyogo (JP)

(73) Assignee: Dainippon Screen Mfg. Co., Ltd. (JP)

( * ) Notice: Subject to any disclaimer, the term of this patent is extended or adjusted under 35 U.S.C. 154(b) by 569 days.

(21) Appl. No.: 10/958,224

(22) Filed: Oct. 4, 2004

(65) Prior Publication Data
US 2005/0079107 A1    Apr. 14, 2005

(30) Foreign Application Priority Data
Oct. 10, 2003  (JP)  ............... 2003-352168

(51) Int. Cl.
  *B01J 3/00*   (2006.01)
  *B01J 19/00*  (2006.01)
  *B08B 3/08*   (2006.01)
  *H01L 21/306* (2006.01)

(52) U.S. Cl. .............. 422/242; 422/105; 422/117; 134/902

(58) Field of Classification Search .............. None
See application file for complete search history.

(56) References Cited

U.S. PATENT DOCUMENTS

| | | | |
|---|---|---|---|
| 5,288,333 A * | 2/1994 | Tanaka et al. ........ | 134/31 |
| 5,470,393 A * | 11/1995 | Fukazawa ........... | 134/3 |
| 5,772,783 A * | 6/1998 | Stucker ............. | 134/12 |
| 6,107,215 A | 8/2000 | Fujimura et al. | |
| 6,306,564 B1 * | 10/2001 | Mullee .............. | 430/329 |
| 6,712,081 B1 | 3/2004 | Uehara et al. | |
| 6,874,513 B2 | 4/2005 | Yamagata et al. | |

(Continued)

FOREIGN PATENT DOCUMENTS

JP    4-346035    12/1992

(Continued)

OTHER PUBLICATIONS

Japanese Office Action issued Jun. 3, 2008 in corresponding Japanese application No. 2003-352168.

*Primary Examiner*—Jennifer A Leung
(74) *Attorney, Agent, or Firm*—Ostrolenk, Faber, Gerb & Soffen, LLP

(57) ABSTRACT

Mixing baths 6A and 6B which temporarily hold chemical agents A and B respectively are disposed. The mixing baths 6A and 6B are each connected with a high-pressure fluid supplying unit 2. For surface treatment using a mixture of the chemical agent A and SCF (processing fluid), SCF is fed under pressure from the high-pressure fluid supplying unit 2 to the mixing bath 6A which already holds the chemical agent A, whereby the chemical agent A dissolves in SCF flowing into the mixing bath 6A and the mixture of the chemical agent A and SCF (processing fluid) is created. As a high-pressure valve (processing fluid introducing valve) 39 is opened, the processing fluid is sent into a pressure vessel 1. This achieves a predetermined surface treatment of a substrate which has been set inside the pressure vessel 1, using the processing fluid.

19 Claims, 15 Drawing Sheets

U.S. PATENT DOCUMENTS

2002/0148492 A1    10/2002    Yamagata et al.
2003/0232512 A1*   12/2003    Dickinson et al. ........... 438/786

FOREIGN PATENT DOCUMENTS

| | | |
|---|---|---|
| JP | 10-303164   | 11/1998 |
| JP | 10-326771   | 12/1998 |
| JP | 2000-58492  | 2/2000  |
| JP | 2001-77074  | 3/2001  |
| JP | 2002-313764 | 10/2002 |
| JP | 2002-353185 | 12/2002 |
| JP | 2003-31533  | 1/2003  |
| WO | 03/041131   | 5/2003  |

* cited by examiner

F I G. 1 2
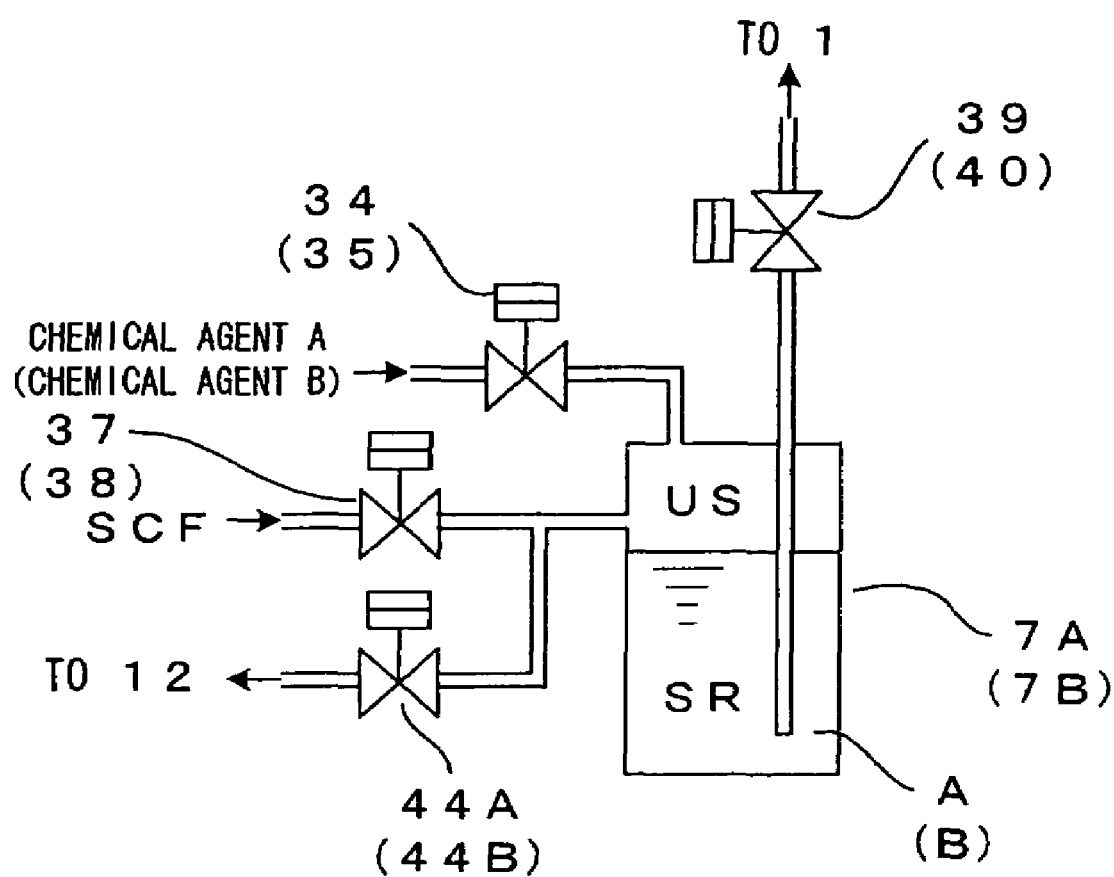

HIGH-PRESSURE PROCESSING APPARATUS AND HIGH-PRESSURE PROCESSING METHOD

CROSS REFERENCE TO RELATED APPLICATION

The disclosure of Japanese Patent Applications No.2003-352168 filed Oct. 10, 2003 including specification, drawings and claims is incorporated herein by reference in its entirety.

BACKGROUND OF THE INVENTION

1. Field of the Invention

The present invention relates to a high-pressure processing apparatus for and a high-pressure processing method of a predetermined surface treatment of a surface of an article-to-be-processed with a processing fluid which may be a high-pressure fluid or a mixture of a high-pressure fluid and a chemical agent and which is brought into contact with the surface of the article-to-be-processed. The articles-to-be-processed include various types of substrates (hereinafter referred to simply as "substrate(s)") such as semiconductor wafers, glass substrates for photomask, glass substrates for liquid crystal display, glass substrates for plasma display and optical disk substrates.

2. Description of the Related Art

Patterning using a resist in a semiconductor manufacturing process necessitates a cleaning step of removing from a substrate unwanted matters and contaminants such as a resist which is not needed any more after forming a pattern, an etching polymer which builds up during etching and stays on the substrate, etc. Noting this, such a high-pressure processing apparatus is known which cleans the substrate, using a mixture of a high-pressure fluid and a chemical agent as a processing fluid which is brought into contact with a surface of the substrate.

In the high-pressure processing apparatus described in Japanese Patent Application Laid-Open Gazette No. 2002-313764 for instance, a substrate is cleaned, with a processing fluid, i.e., a mixture of a high-pressure fluid and a plurality of chemical agents supplied to a processing chamber in which the substrate has been set. More particularly, this high-pressure processing apparatus comprises high-pressure fluid supplying means which supplies the high-pressure fluid to the processing chamber, first chemical agent supplying means which supplies a first chemical agent to the processing chamber, and second chemical agent supplying means which supplies a second chemical agent to the processing chamber. For pressure feeding of the high-pressure fluid, the chemical agents and the like to the processing chamber, a pressure-feed pump (high-pressure pump) is disposed to each one of these supplying means.

SUMMARY OF THE INVENTION

By the way, in the conventional apparatus described above, because of the chemical agent supplying means each disposed for each chemical agent which is to be mixed with the high-pressure fluid, there must be as many pressure-feed pumps as the types of chemical agents. Since pressure-feed pumps are generally expensive, the increased number of pressure-feed pumps immediately push up the cost of the high-pressure processing apparatus. To be noted in particular is the tendency that more types of chemical agents are used to improve the versatility, the capabilities and the like of the high-pressure processing apparatus, which is one of main causes of the increased manufacturing cost of the high-pressure processing apparatus.

In addition, while plunger pumps are generally used as the pressure-feed pumps which supply the chemical agents to the processing chamber, this causes a problem that the chemical agents leak out as the durability of plunger seals deteriorate and particles created by reciprocal movements of plungers get in the processing fluid.

A primary object of the present invention is to simplify the structures of and reduce the costs of a high-pressure processing apparatus for and a high-pressure processing method of a predetermined surface treatment of a surface of an article-to-be-processed with a processing fluid which is created by mixing a high-pressure fluid with all or some of a plurality of chemical agents and which is brought into contact with the surface of the article-to-be-processed.

To achieve the object above, one aspect of the high-pressure processing apparatus according to the present invention comprises: a pressure vessel which internally includes a processing chamber which is for executing the surface treatment; a high-pressure fluid supplier which feeds the high-pressure fluid under pressure; a mixing bath which internally includes a reservoir space in which it is possible to hold the chemical agent; a chemical agent supplier which supplies the chemical agent to the mixing bath; and a channel control system which controls a channel of the high-pressure fluid fed under pressure from the high-pressure fluid supplier, wherein the channel control system makes the high-pressure fluid fed under pressure to the mixing bath which holds the chemical agent supplied from the chemical agent supplier, thereby creating the mixture inside the mixing bath, and the channel control system makes the mixture sent into the pressure vessel.

According to the invention employing such a structure, as the channel control system controls the channel of the high-pressure fluid which is fed under pressure from the high-pressure fluid supplier, the high-pressure fluid is fed under pressure to the mixing bath which already holds the chemical agent and the mixture is created by mixing the high-pressure fluid with the chemical agent inside the mixing bath. Owing to the pressure feeding force of the high-pressure fluid, the mixture is sent into the pressure vessel from the mixing bath. In this manner, the invention which utilizes the pressure feeding force of the high-pressure fluid does not require a high-pressure pump which is indispensable in conventional apparatuses to add the chemical agent to the high-pressure fluid or supply the chemical agent under pressure directly to the pressure vessel.

The high-pressure processing method according to the present invention comprises the steps of: supplying a chemical agent to a mixing bath; and feeding a high-pressure fluid under pressure to the mixing bath to thereby mix the high-pressure fluid with the chemical agent which is held in the mixing bath and create the mixture, and thereafter sending the mixture into the pressure vessel to thereby increase the pressure inside the pressure vessel.

According to the invention employing such a structure, the high-pressure fluid is fed under pressure to the mixing bath which already holds the chemical agent and the mixture is created. The mixture is fed into the pressure vessel and the pressure inside the pressure vessel is consequently enhanced, and hence, even in the middle of the pressure enhancement, the chemical agent component is fed together with the high-pressure fluid into the pressure vessel and the surface treatment of the article-to-be-processed is realized.

The other aspect of the high-pressure processing apparatus according to the present invention comprises: a pressure vessel which internally includes a processing chamber which is for executing the surface treatment; a high-pressure fluid supplier which feeds the high-pressure fluid under pressure; an intermediate bath which internally includes a reservoir space in which it is possible to hold the chemical agent; a chemical agent supplier which supplies the chemical agent to the intermediate bath; and a channel control system which controls a channel of the high-pressure fluid fed under pressure from the high-pressure fluid supplier, wherein the channel control system makes the high-pressure fluid from the high-pressure fluid supplier fed under pressure toward the pressure vessel, makes a part of the high-pressure fluid fed under pressure into the intermediate bath which holds the chemical agent supplied from the chemical agent supplier, and accordingly makes the chemical agent held in the intermediate bath sent into the pressure vessel.

According to the invention employing such a structure, as the channel control system controls the channel of the high-pressure fluid which is fed under pressure from the high-pressure fluid supplier, the high-pressure fluid coming from the high-pressure fluid supplier is fed toward the pressure vessel and a part of the high-pressure fluid is fed toward the intermediate bath which already holds the chemical agent. Owing to the pressure feeding force of the high-pressure fluid thus fed under pressure, the chemical agent inside the intermediate bath is sent into the pressure vessel. In this manner, the invention which utilizes the pressure feeding force of the high-pressure fluid does not require a high-pressure pump which is indispensable in conventional apparatuses to add the chemical agent to the high-pressure fluid or supply the chemical agent under pressure directly to the pressure vessel.

The high-pressure fluid used in the present invention is preferably carbon dioxide because of its safety, price and easiness to shift to the supercritical state. Besides carbon dioxide, water, ammonia, nitrous oxide, ethanol and the like can be used. A high-pressure fluid is used since it has a high diffusion coefficient and makes it possible to diffuse a dissolved contaminant across a medium. When turned into a supercritical fluid, a high-pressure fluid exhibits intermediate properties between gas and liquid and the diffusion coefficient of the high-pressure fluid becomes close to that of gas, and therefore, the high-pressure fluid can contain a far larger amount of an additive (chemical agent) than gas can.

The high-pressure fluid referred to in relation to the present invention is a fluid whose pressure is 1 MPa or higher. The high-pressure fluid is preferably such a fluid having a high density, a high solubility, a low viscosity and a high diffusivity, and more preferably a fluid in the supercritical state or the subcritical state. At 7.4 MPa or beyond at 31° C., carbon dioxide can be turned into a supercritical fluid. At drying steps in particular, it is desirable to use a subcritical fluid (high-pressure fluid) or a supercritical fluid which is 5 through 30 MPa and it is more desirable to execute these processes at 7.4 through 20 MPa.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 12 is a drawing which shows an intermediate bath of a high-pressure processing apparatus according to a third embodiment;

DETAILED DESCRIPTION OF THE PREFERRED EMBODIMENTS

First Embodiment

Figure 1:
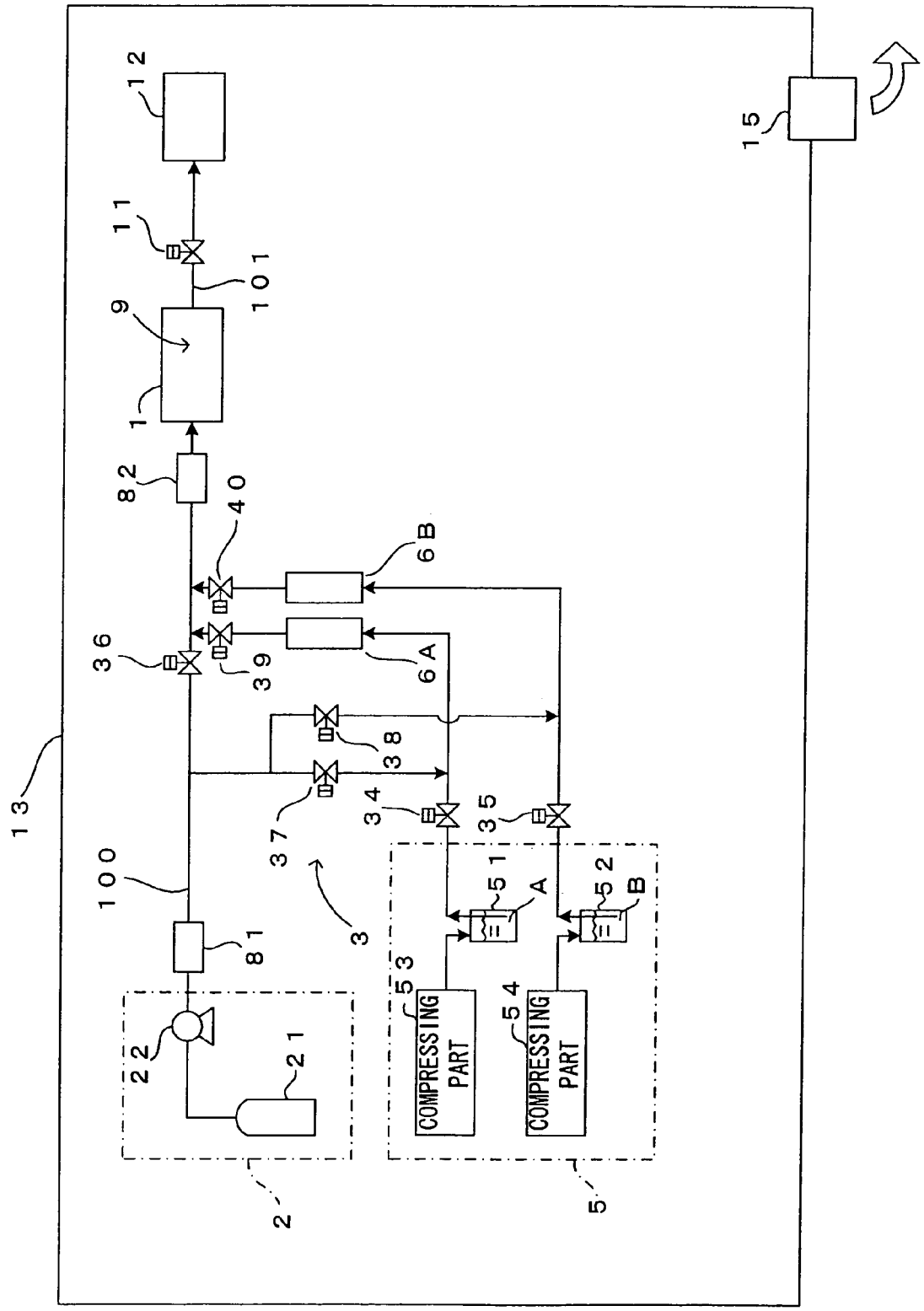
FIG. 1 is a drawing which shows a first embodiment of a high-pressure processing apparatus according to the present invention.

FIG. 1 is a drawing which shows the first embodiment of the high-pressure processing apparatus according to the present invention. The high-pressure processing apparatus according to the first embodiment is an apparatus wherein a processing chamber 9 provided inside a pressure vessel 1 is supplied with a processing fluid which is supercritical carbon dioxide or a mixture of supercritical carbon dioxide and a chemical agent, and a substrate (article-to-be-processed) such as a semiconductor wafer which is shaped approximately like a circle and held within the processing chamber 9 is subjected to predetermined cleaning process, rinsing process and drying process. The structure and operations of the high-pressure processing apparatus will now be described in detail.

In this high-pressure processing apparatus, there are a high-pressure fluid supplying unit 2 for pressure feeding of supercritical carbon dioxide as the "high-pressure fluid" of the present invention (hereinafter referred to as "SCF") to the pressure vessel 1, a chemical agent supplying unit 5 which supplies chemical agents A and B respectively to mixing baths 6A and 6B, and a channel control unit 3 which makes high-pressure valves 34 through 40 open and close and accordingly controls channels of the high-pressure fluid fed under pressure from the high-pressure fluid supplying unit 2. Further, there is a pressure adjusting valve 11 between the pressure vessel 1 and a reservoir 12.

The high-pressure fluid supplying unit 2 comprises a high-pressure fluid reservoir tank 21 and a high-pressure pump 22. In the event that liquefied carbon dioxide or supercritical carbon dioxide is used as the high-pressure fluid as described above, it is usually liquefied carbon dioxide that is held in the high-pressure fluid reservoir tank 21. When a pressure drop in the piping including an acceleration resistance is large, the fluid may be cooled in a supercooling device (not shown) in advance to prevent gasification at the high-pressure pump 22. As this fluid is compressed at the high-pressure pump 22, high-pressure liquefied carbon dioxide is obtained. The outlet side of the high-pressure pump 22 is connected to the pressure vessel 1 by a high-pressure pipe 100 which has a first heater 81, a high-pressure valve 36 and a second heater 82 interposed therein. The high-pressure valve 36 opens in response to an open/close command received from a controller (not shown) which is one component of the channel control unit 3, so that the first heater 81 heats high-pressure liquefied carbon dioxide thus compressed at the high-pressure pump 22, SCF is obtained as the high-pressure fluid, and SCF is fed directly to the pressure vessel 1 under pressure. The second heater 82 is disposed in case that the high-pressure fluid gets cooled down beyond a supercritical temperature through a branch pipe which will be described later and therefore needs be heated up after arriving at the high-pressure pipe 100 so as to be supplied as SCF to the pressure vessel 1. The high-pressure pipe 100 branches out immediately in front of the high-pressure valve 36, and these branch pipes are connected to the mixing baths 6A and 6B. Hence, it is possible to supply SCF to the mixing baths 6A and 6B as needed.

To allow use of the two types of chemical agents A and B, the chemical agent supplying unit 5 comprises reservoir tanks 51 and 52 which hold the chemical agents A and B respectively, and compressing parts 53 and 54 which are for supplying the chemical agents A and B respectively to the mixing baths 6A and 6B. To be more specific, the compressing part 53 is connected to the reservoir tank 51 and the reservoir tank 51 is connected to the mixing bath 6A via the high-pressure valve 34, as a chemical agent supply system for supplying the chemical agent A to the mixing bath 6A. As the high-pressure valve 34 opens and closes in response to an open/close command received from the controller therefore, the chemical agent A is supplied to the mixing bath 6A accordingly at the timing which will be described later. A chemical agent supply system for supplying the chemical agent B to the mixing bath 6B has a similar structure to that of the chemical agent supply system for supplying the chemical agent A. In other words, the reservoir tank 52 is connected to the compressing part 54 and the mixing bath 6B, and as the high-pressure valve 35 opens and closes in response to an open/close command received from the controller, the compressing part 54 feeds the chemical agent B out from the reservoir tank 52 at the timing which will be described later and the chemical agent B is supplied to the mixing bath 6B via the high-pressure valve 35. Any desired number of chemical agents and any desired types of chemical agents may be used for the processing and chosen properly in accordance surface treatments. Further, although this embodiment requires that the chemical agents are supplied by means of compression control using nitrogen, etc., the chemical agent supplying method is not limited to any particular method: Compression may be realized utilizing a part of the pressure at the high-pressure pump 22.

Figure 2:
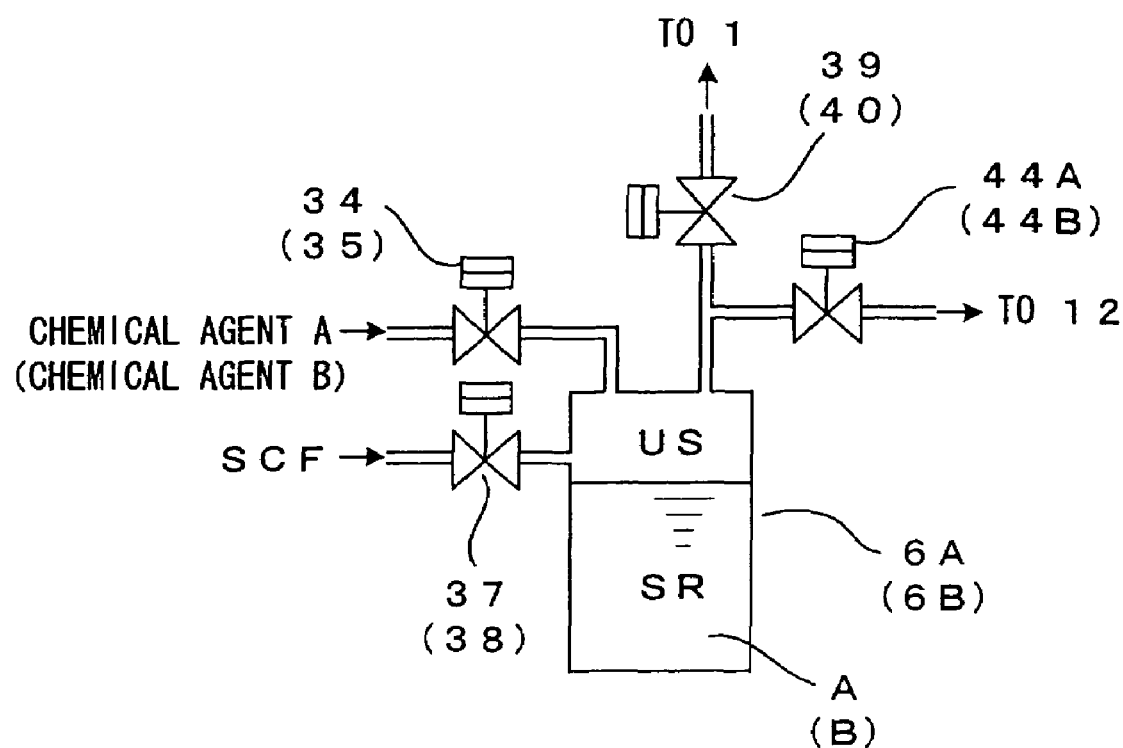
FIG. 2 is a drawing which shows a mixing bath of the high-pressure processing apparatus according to the first embodiment.

FIG. 2 is a drawing which shows the structure of the mixing baths. While the two types of chemical agent supply systems are used in this embodiment as described above, these basically have the same structure. The mixing baths 6A and 6B used in the chemical agent supply systems for this reason have a common structure. Therefore, the structure of the mixing bath 6A and a mixing operation in the mixing bath 6A will now be described in detail with reference to FIG. 2, and the structure of the mixing bath 6B and a mixing operation in the mixing bath 6B will be denoted at the same or corresponding reference symbols but will not be described. Those reference symbols in parentheses in FIG. 2 are reference symbols used for the mixing bath 6B.

As shown in FIG. 2, the mixing bath 6A internally has a reservoir space in which it is possible to hold a chemical agent. A pipe seating a chemical agent replenishing valve (high-pressure valve) 34 is connected to a ceiling portion of the mixing bath 6A, which allows feeding of the chemical agent A from the chemical agent supplying unit 5 to the bottom of the reservoir space from the ceiling side of the mixing bath 6A. An upper side portion of the mixing bath 6A is connected to the high-pressure fluid supplying unit 2 via a high-pressure valve 37, and as the high-pressure valve 37 opens and closes in response to an open/close command received from the controller, SCF is fed at the timing which will be described later to an upper portion of the reservoir space. In this manner, it is possible to supply SCF and the chemical agent A to and mix in the mixing bath 6A. Further, for pressure feeding of thus prepared mixture to the pressure vessel 1, a pipe seating a high-pressure valve 39 is connected to the ceiling portion of the mixing bath 6A. A part of this pipe branches out, a pressure relief valve 44A is interposed in this branch pipe, and the branch pipe leads to the reservoir 12. FIG. 1 referred to earlier omits a channel which branches from the pipe for the mixing bath 6A and leads to the reservoir 12 via the pressure relief valve 44A. This channel is similarly omitted in FIGS. 8, 9 and 15 which will be described later.

The chemical agent A and SCF are mixed with each other inside the mixing bath 6A which has such a structure, according to the following procedure. That is, the pressure relief valve 44A is opened at the initial stage (the high-pressure valves are all close) and the pressure inside the mixing bath 6A is released to the reservoir 12. This makes it possible to supply under pressure the chemical agent A into the mixing bath 6A. The chemical agent replenishing valve 34 is then opened, supplying the chemical agent A from the chemical agent supplying unit 5 to the mixing bath 6A. After supplying (replenishing) a predetermined amount of the chemical agent A, the pressure relief valve 44A and the chemical agent replenishing valve 34 are closed, whereby supply (replenishment) of the chemical agent to the mixing bath 6A completes. For exchange of the chemical agent, a drain valve (not shown) disposed to a bottom portion of the mixing bath is opened and the chemical agent held in the mixing bath is all discharged. As the chemical agent is supplied according to the procedure above after closing the drain valve, the chemical agent is exchanged. In this embodiment, instead of supplying or replenishing the chemical agent A to the entire reservoir space inside the mixing bath 6A, the chemical agent A is held in the reservoir space leaving an upper portion of the reservoir space empty. Hence, as shown in FIG. 2, an empty reservoir area US of the reservoir space not holding the chemical agent communicates with the high-pressure fluid supplier 2 via the high-pressure valve 37 and with the pressure vessel 1 via the high-pressure valve 39. As the high-pressure valve 37 opens therefore, SCF from the high-pressure fluid supplier 2 flows into and passed the empty reservoir area US and further flows to the pressure vessel 1 through the pipe. During this, the chemical agent A held in an occupied reservoir area SR dissolves in SCF and a mixture is created consequently. The high-pressure valve 39 then opens, and thus created mixture is fed into the pressure vessel 1. Thus, in this embodiment, the chemical agent A is brought into contact with the flow of SCF moving in the empty reservoir area US, making the chemical agent A naturally dissolve in and mix with the flow of SCF. Alternatively, an agitation mechanism for agitating the chemical agent held in the occupied reservoir area SR and/or an agitation mechanism for agitating SCF flowing through the empty reservoir area US may be disposed, or a constant temperature mechanism for heating the chemical agent held in the occupied reservoir area SR to a constant temperature may be disposed in order to facilitate dissolution of the chemical agent in SCF. To distinguish from other mixing methods, the mixing baths using the mixing method described above will be herein referred to as "mixing baths of a natural dissolution type."

During removal of an etching polymer and the like from a substrate, since the etching rate of the substrate changes depending upon the concentration of a chemical agent in SCF (i.e., chemical concentration), it is necessary to strictly control the chemical concentration. Further, a chemical agent thus used generally will not easily dissolve in SCF and is therefore used together with an auxiliary such as alcohol. The mixture thus contains three or more components. Such a chemical agent may induce a pressure drop in the pipes and the like, or may have a two-phase region due to a temperature change or the like when the mixture composition is in a saturation region and damage the substrate sometimes. To deal with this, the substrate may be cleaned with the chemical agent A, according to the following procedure. First, after supplying such a predetermined amount of the chemical agent A to the mixing bath 6A which will not reach the saturation concentration of SCF, the high-pressure valve 37 is opened and SCF is introduced into the mixing bath 6A. The chemical agent A held inside the mixing bath 6A is then dissolved completely in thus introduced SCF, and the mixture is consequently created. Following this, the high-pressure valve 39 is opened, thereby introducing thus created mixture to the pressure vessel 1 as the high-pressure fluid and cleaning with this high-pressure fluid having the predetermined chemical concentration. For facilitation of uniform dissolution of the chemical agent A inside the mixing bath 6A at this stage, the mixing bath 6A may be equipped with the agitating function as described above or an SCF introduction/dispersion plate or the like may be disposed. The SCF introduction/dispersion plate is preferably a porous plate-like member, etc. It is desirable that such an SCF introduction/dispersion plate is located inside the mixing bath 6A at an opposed position with a supply inlet through which SCF is supplied (and as the case may be, further at an opposed position with a supply inlet through which the chemical agent A is supplied).

The structure of the high-pressure processing apparatus will be further described, referring back to FIG. 1. The pressure vessel 1 communicates with the reservoir 12 via a high-pressure pipe 101. A pressure adjusting valve 11 is interposed in the high-pressure pipe 101. Hence, the processing fluid and the like inside the pressure vessel 1 are discharged to the reservoir 12 when the pressure adjusting valve 11 opens, and when the pressure adjusting valve 11 closes, the processing fluid can be encaged in the pressure vessel 1.

The reservoir 12 may be a gas/fluid separation container or the like for instance. Using a gas/fluid separation container, SCF is separated into a gas component and a fluid component which will then be discarded through separate paths. Alternatively, the respective components may be collected (and purified if needed) for reuse. The gas component and the fluid component thus separated by the gas/fluid separation container may be discharged to outside through separate paths.

Considering that a chemical agent contains a toxic substance (such as hydrogen fluoride), the high-pressure apparatus as a whole is housed in a sealed structure 13 as shown in FIG. 1. Owing to this, all sections which could leak a toxic substance are all housed in the sealed structure. This minimizes contamination with the toxic substance even if the toxic substance has leaked out from the high-pressure processing apparatus. In addition, since the sealed structure 13 comprises an exhausting device 15, gases inside sealed structure 13 containing the leaked toxic substance can be discharged efficiently. As for the gases discharged by the exhausting device 15, a detoxifying device not shown may be used to properly process the gases, makes the toxic substance harmless and emit the gases to atmosphere.

Figure 3:
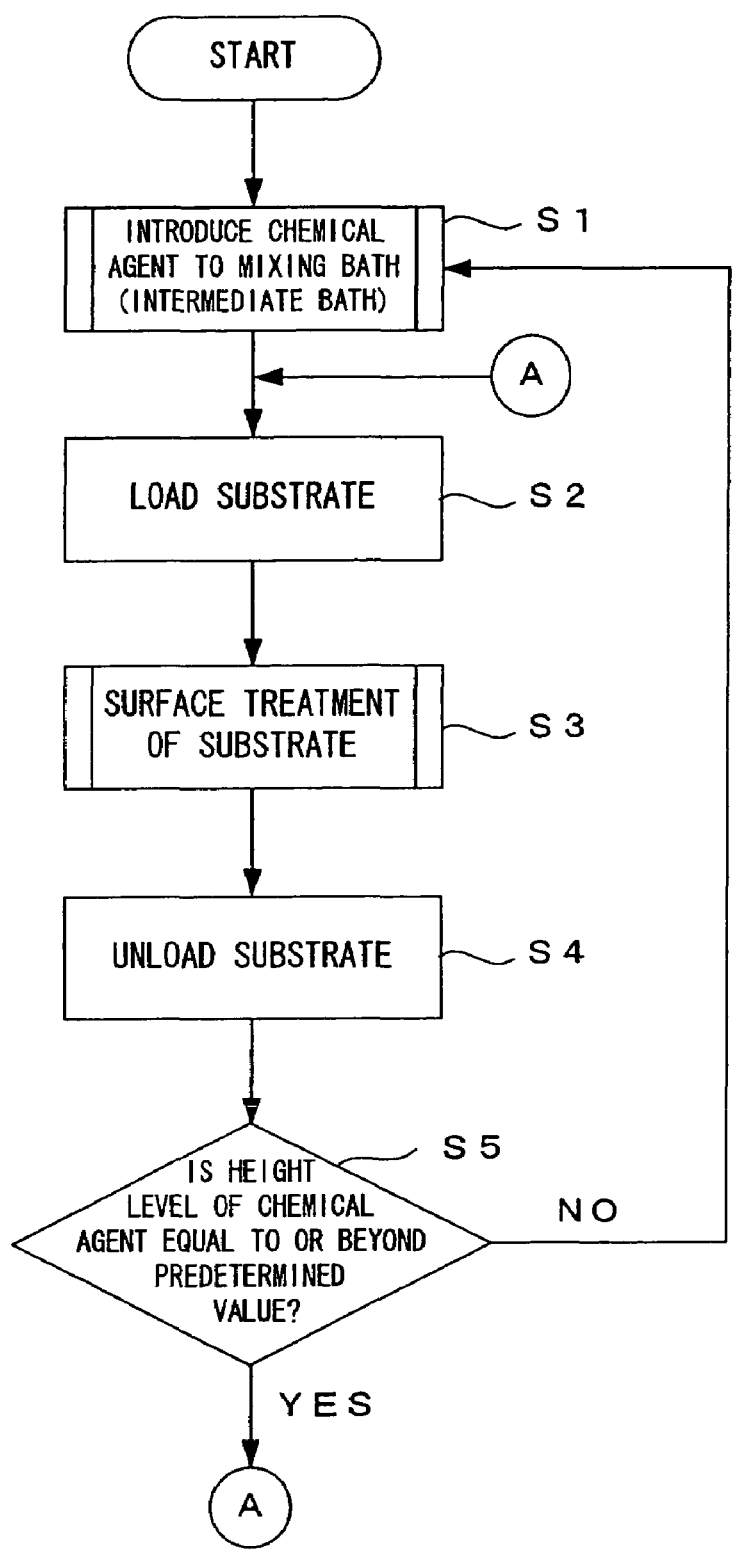
FIG. 3 is a flow chart which shows operations of the high-pressure processing apparatus which is shown in FIG. 1.

The operations of the high-pressure processing apparatus having such a structure above will now be described with reference to FIGS. 3 through 5. FIG. 3 is a flow chart which shows operations of the high-pressure processing apparatus which is shown in FIG. 1. The following relates to an example that using the two types of chemical agents A and B, a substrate (article-to-be-processed) such as a semiconductor wafer is subjected to predetermined surface treatments. In this high-pressure processing apparatus, as preparation for execution of the surface treatments of the substrate at the step S1, the chemical agents A and B are introduced respectively to the mixing baths 6A and 6B.

Figure 4:
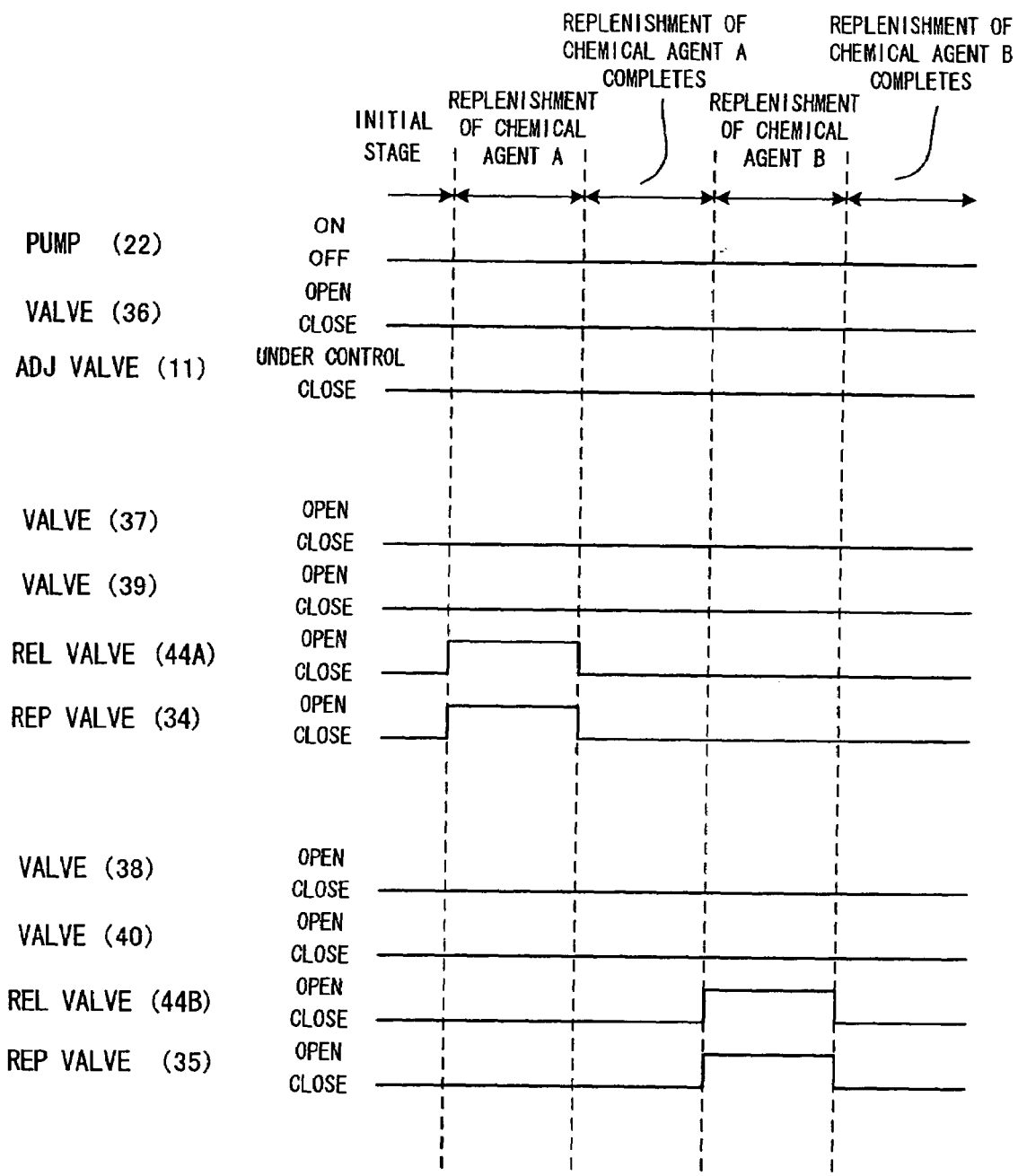
FIG. 4 is a timing chart which shows an operation of introducing chemical agents to mixing baths within the high-pressure processing apparatus which is shown in FIG. 1.

FIG. 4 is a timing chart which shows an operation of introducing the chemical agents to the mixing baths within the high-pressure processing apparatus which is shown in FIG. 1. At the initial stage, the high-pressure valves 34 through 40 are all close and the high-pressure pump 22 is in a halt condition. First, with the pressure relief valve 44A and the chemical agent replenishing valve 34 open, the compressing part 53 of the chemical agent supplying unit 5 compresses the chemical agent A and the chemical agent A is supplied (replenished) to the mixing bath 6A (REPLENISHMENT OF CHEMICAL AGENT A). Since the mixing bath 6A is of the so-called natural dissolution type which makes the chemical agent A mix with SCF by natural dissolution in this embodiment as described above, the chemical agent is supplied to the mixing bath 6A while leaving the empty reservoir area US open. After holding a predetermined amount of the chemical agent A in the mixing bath 6A, the pressure relief valve 44A and the chemical agent replenishing valve 34 are closed (REPLENISHMENT OF CHEMICAL AGENT A COMPLETES). Following this, the chemical agent B is supplied (replenished) according to similar procedure to that for the chemical agent A. That is, with the pressure relief valve 44B and the chemical agent replenishing valve 35 open, the compressing part 54 of the chemical agent supplying unit 5 compresses the chemical agent B and the chemical agent B is supplied (replenished) to the mixing bath 6B (REPLENISHMENT OF CHEMICAL AGENT B). After holding a predetermined amount of the chemical agent B in the mixing bath 6B, the pressure relief valve 44B and the chemical agent replenishing valve 35 are closed (REPLENISHMENT OF CHEMICAL AGENT B COMPLETES). Although this embodiment requires that the chemical agent B is replenished after replenishment of the chemical agent A, replenishment of the chemical agents A and B respectively to the mixing baths 6A and 6B may start at the same time. In such an instance however, one must note that depending upon the types of the chemical agents, the replenishment time may be different.

As introduction of the chemical agents to the mixing baths completes in this fashion, the sequence proceeds to Step S2 shown in FIG. 3, at which a handling machine, such as an industrial robot, a transportation mechanism and the like not shown loads the substrate which is the article-to-be-processed into the processing chamber 9. The predetermined surface treatments of the substrate are then executed (Step S3). Described below is an example of executing a surface treatment using a mixture of the chemical agent A and SCF as the processing fluid, a surface treatment using a mixture of the chemical agent B and SCF as the processing fluid, and drying with SCF in this order.

Figure 5:
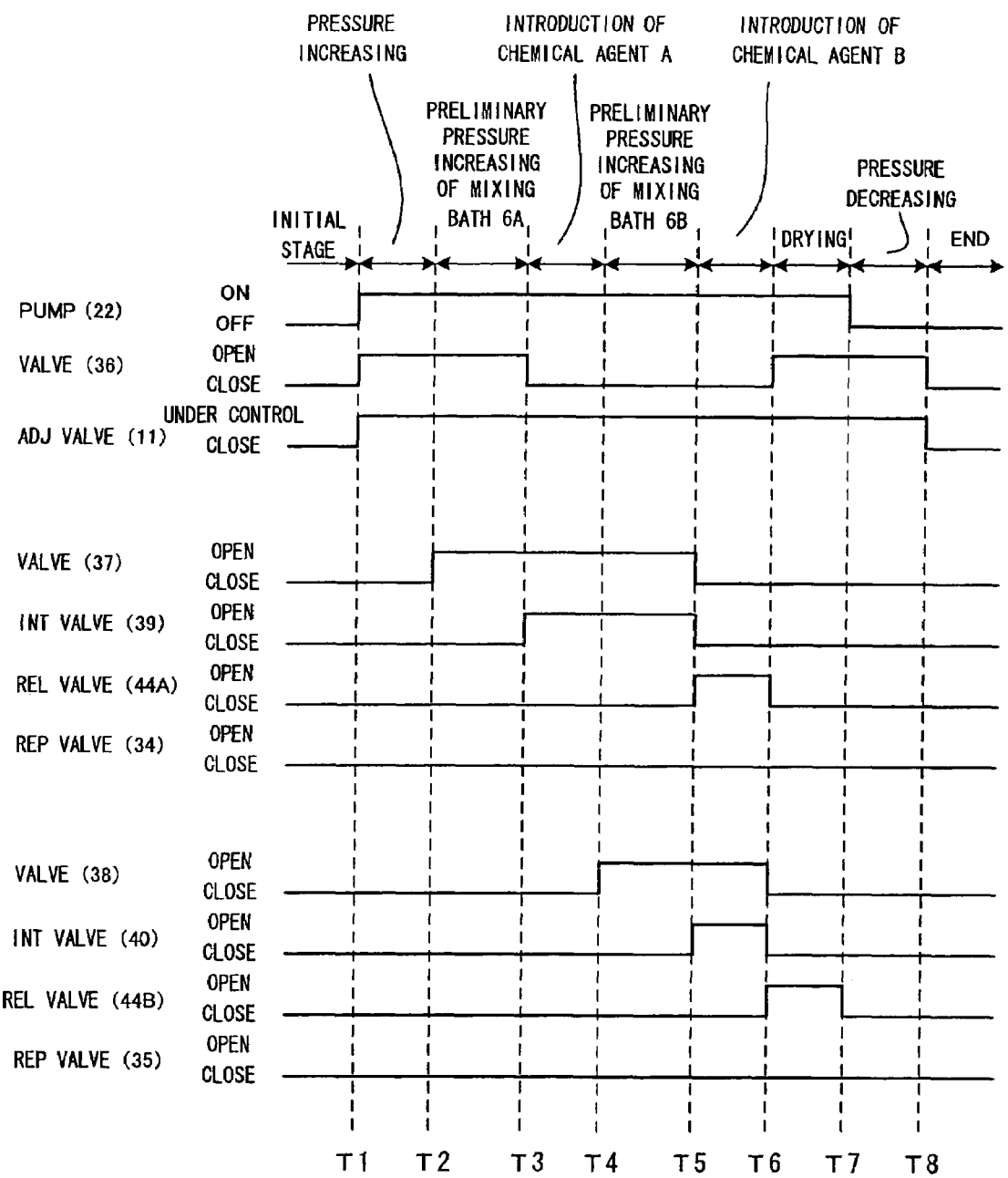
FIG. 5 is a timing chart which shows operations of substrate surface treatments within the high-pressure processing apparatus which is shown in FIG. 1.

FIG. 5 is a timing chart which shows operations of substrate surface treatments within the high-pressure processing apparatus which is shown in FIG. 1. At the initial stage, the high-pressure valves 34 through 40 are all close and the high-pressure pump 22 is in a halt condition. First, at Timing T1, the high-pressure valve 36 is opened to make SCF ready for pressure feeding to the pressure vessel 1 from the high-pressure fluid supplying unit 2, and the high-pressure pump 22 is activated. This achieves pressure feeding of SCF to the pressure vessel 1, and the pressure inside the pressure vessel 1 gradually increases. With the pressure adjusting valve 11 opened or closed in response to an open/close command received from the controller at this stage, the pressure inside the pressure vessel 1 is kept constant. The pressure adjustment by means of this controlled opening/closing continues until decompression has completed. When it is necessary to adjust the temperature of the pressure vessel 1, a heater (not shown) disposed in the vicinity of the pressure vessel 1 sets the temperature to appropriate temperatures to the surface treatments.

Next, with the high-pressure valve 37 opened after the pressure vessel 1 has reached a predetermined pressure (Timing T2), a part of the SCF flow fed under pressure from the high-pressure fluid supplying unit 2 to the pressure vessel 1 is guided into the mixing bath 6A. In consequence, the pressure inside the mixing bath 6A rises preliminarily, which makes the chemical agent A held in the occupied reservoir area SR dissolve in SCF flowing into the empty reservoir area US and creates the mixture of the chemical agent A and SCF (hereinafter referred to as the "processing fluid A").

With the high-pressure valve 36 closed at the next timing T3 and the high-pressure valve (processing fluid introducing valve) 39 open, the processing fluid A is fed into the pressure vessel 1. At this stage, all of the SCF flow fed under pressure from the high-pressure fluid supplying unit 2 is sent as the processing fluid A into the pressure vessel 1 through the mixing bath 6A. This achieves the predetermined surface treatment of the substrate set inside the pressure vessel 1 using the processing fluid A.

Following this, the high-pressure valve 38 is opened during the surface treatment of the substrate using the processing fluid A (Timing T4), and SCF fed under pressure from the high-pressure fluid supplying unit 2 toward the mixing bath 6A is partially branched out and guided into the mixing bath 6B. The pressure inside the mixing bath 6B rises preliminarily, which makes the chemical agent B held in the occupied reservoir area SR dissolve in SCF flowing into the empty reservoir area US and creates the mixture of the chemical agent B and SCF (hereinafter referred to as the "processing fluid B").

As the surface treatment of the substrate using the processing fluid A completes, the high-pressure valve 37 and the high-pressure valve (processing fluid introducing valve) 39 are closed to thereby stop supplying of the processing fluid A into the pressure vessel 1, and the pressure relief valve 44A of the mixing bath 6A is opened to thereby release the pressure inside the mixing bath 6A to the reservoir 12 (Timing T5). The high-pressure valve (processing fluid introducing valve) 40 is then opened, thereby feeding the processing fluid B into the pressure vessel 1. This achieves the predetermined surface treatment of the substrate set inside the pressure vessel 1 using the processing fluid B.

As the surface treatment of the substrate using the processing fluid B completes, the high-pressure valve 38 and the high-pressure valve (processing fluid introducing valve) 40 are closed to thereby stop supplying of the processing fluid B into the pressure vessel 1, and the high-pressure valve 36 is opened to thereby feed SCF directly to the pressure vessel 1 from the high-pressure fluid supplying unit 2. With this, the substrate is dried with SCF (Timing T6). With the pressure relief valve 44B of the mixing bath 6B is open, the pressure inside the mixing bath 6B is released to the reservoir 12. After the pressures inside the mixing baths 6A and 6B have been released, the pressure relief valves 44A and 44B are closed.

The high-pressure pump 22 is then stopped at Timing T7, thereby decreasing the pressure inside the pressure vessel 1. When the pressure returns to a normal pressure (Timing T8), the pressure adjusting valve 11 and the high-pressure valve 36 are closed, which completes the surface treatments of the substrate.

Upon completion of the surface treatments of the substrate, the transportation mechanism unloads thus processed substrate out from the processing chamber 9 (Step S4). In the event that the amount of the chemical agent inside the mixing bath (the height level of the chemical agent) is at or beyond a predetermined value, the next substrate yet to be processed is loaded in the processing chamber 9 and the series of the surface treatments of the substrate is executed. On the other hand, whether the amount of the chemical agent inside the mixing bath (the height level of the chemical agent) is at or beyond the predetermined value is determined (Step S5) and when it is determined that the amount is below the predetermined value, the surface treatments of the substrate are executed after the process of introducing the chemical agent into the mixing bath which is shown in FIG. 4.

As described above, for feeding of the mixtures of the chemical agents and SCF into the pressure vessel 1 as the processing fluids, the mixing baths are disposed each for each one of the chemical agents A and B, and the mixtures of the chemical agents and SCF are created and fed into the pressure vessel, and therefore, it is not necessary to dispose a high-pressure pump which is for feeding the chemical agents under pressure to the flow of SCF or directly into the pressure vessel. The apparatus is simpler and costs are reduced more as compared to conventional apparatuses. To be particularly noted, it is not necessary to dispose a high-pressure pump each for each chemical agent in such an instance that multiple types of chemical agents are to be used in an effort to enhance the versatility and the capabilities of the apparatus, which is remarkably effective.

While plunger pumps are generally used as the high-pressure pumps, since high-pressure pumps for pressure feeding of the chemical agents are omitted, it is possible to prevent leakage of the chemical agents which would otherwise occur owing to deterioration of the durability of plunger seals. Further, it is possible to reduce inclusion of particles created by sliding of plungers in the processing fluids and realize favorable surface treatments of substrates.

Figure 6:
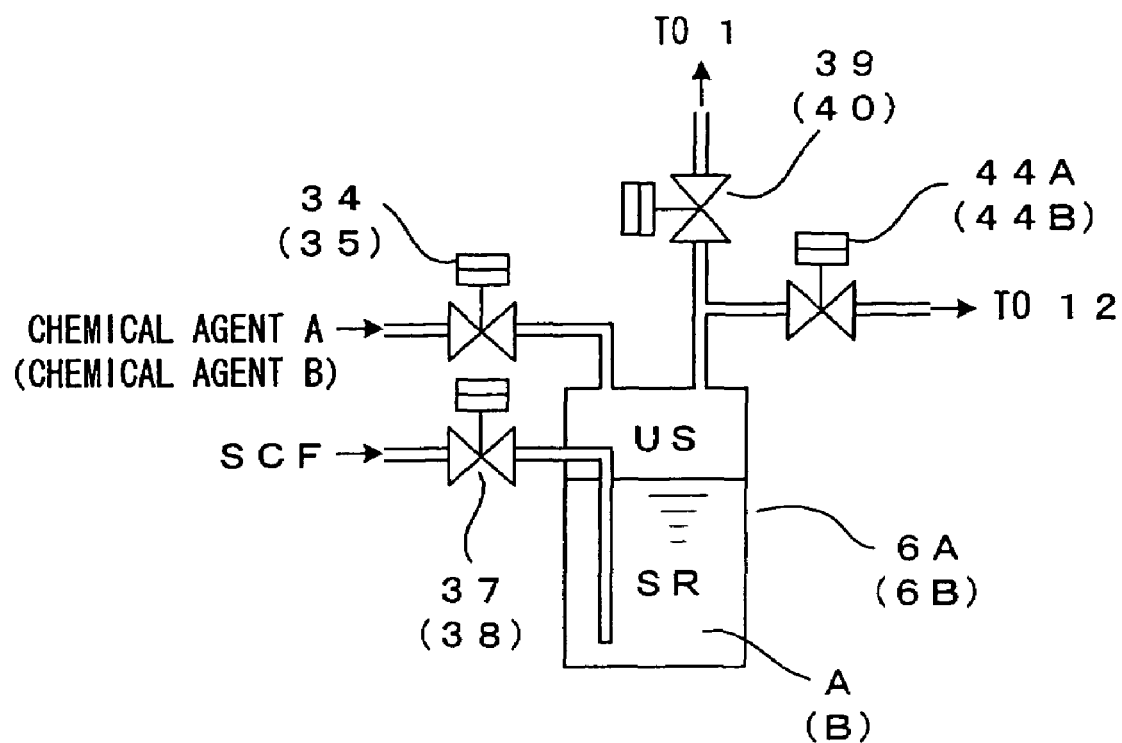
FIG. 6 is a drawing which shows other example of the mixing bath applicable to the high-pressure processing apparatus according to the first embodiment.

The mixing baths used in this embodiment are not limited to mixing baths of the natural dissolution type but may be mixing baths of other mixing method as that shown in FIG. 6 for example. The same structures as those shown in FIG. 2 will be denoted at the same reference symbols but will not be described. The different structure and operations of the other mixing baths will be mainly described.

In FIG. 6, the occupied reservoir area SR of the reservoir space where the chemical agent is held communicates with the high-pressure fluid supplying unit 2 via the high-pressure valve 37, whereas the empty reservoir area US where no chemical agent is held communicates with the pressure vessel 1 via the high-pressure valve 39. Hence, SCF flows into the occupied reservoir area SR from the high-pressure fluid supplying unit 2 and the chemical agent A is bubbled as the high-pressure valve 37 is opened, the chemical agent A dissolves in SCF and the mixture is created and appears in the empty reservoir area US. As the high-pressure valve 39 is opened, thus created mixture is sent into the pressure vessel 1. In this mixing bath 6A, a flow of SCF is fed directly to the occupied reservoir area SR and the chemical agent is forcedly mixed with the SCF flow. The mixing bath 6B is structured similarly to above. A mixing bath of the mixing method above will be herein referred to as a "mixing bath of a bubbler type." Since a chemical agent is forcedly mixed with an SCF flow in a mixing bath of the bubbler type, the chemical agent could be mixed in SCF at or beyond the solubility limit. On the contrary, in the case of a mixing bath of the natural dissolution type shown in FIG. 2, since a chemical agent naturally dissolves in and mixes with a flow of SCF which flows through the mixing bath, the mixing bath has a characteristic that mixing of the chemical agent with SCF is allowed only at or below the solubility limit.

Thus, in the case of a mixing bath of the natural dissolution type, there is no concern that a chemical agent could be mixed with SCF more than needed. Hence, in a high-pressure processing apparatus which uses mixing baths of the natural dissolution type, a surface treatment of a substrate can start immediately after the high-pressure pump 22 has started operating as shown in FIG. 7 for instance.

Figure 7:
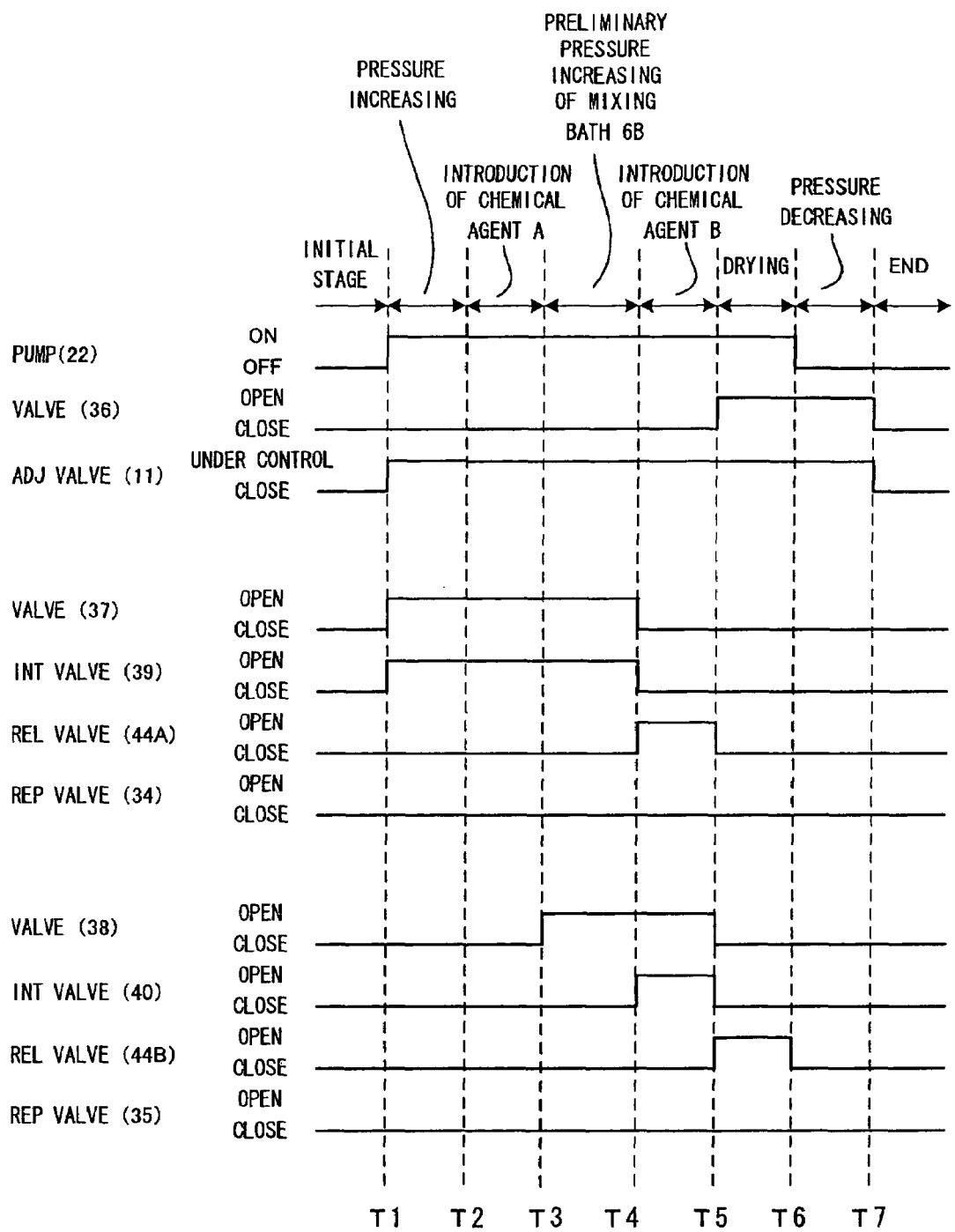
FIG. 7 is a timing chart which shows a modification of the high-pressure processing apparatus according to the first embodiment.

FIG. 7 is a timing chart which shows operations of other substrate surface treatments in the high-pressure processing apparatus of FIG. 1. During this surface treatments of a substrate, with the high-pressure pump 22 activated at Timing T1 and with the high-pressure valve 37 and the high-pressure valve (processing fluid introducing valve) 39 opened (but with the high-pressure valve 36 closed), SCF is made ready for pressure feeding to the pressure vessel 1 from the high-pressure fluid supplying unit 2 through the mixing bath 6A. At this stage, the chemical agent A dissolves in SCF flowing into the mixing bath 6A, the mixture of the chemical agent A and SCF (processing fluid A) is created, and the processing fluid A is fed into the pressure vessel 1. The pressure inside the pressure vessel 1 is accordingly increases, and the surface treatment of a substrate using the processing fluid A takes place. Operations after this are similar to those of the surface treatment of a substrate shown in FIG. 5. Since the surface treatment of a substrate using the processing fluid A starts immediately after the high-pressure pump has started operating during the substrate surface treatment which is shown in FIG. 7, the substrate processing time shortens, which makes it possible to improve the throughput per substrate of the substrate processing.

More strictly describing, the pressure inside the pipe from the high-pressure pump 22 to the mixing bath 6A and inside the mixing bath 6A do not rise sufficiently during a period of pressurizing the pressure vessel 1 from Timing T1 to Timing T2, and there is a predetermined period during which the pressure is less than a critical pressure. Hence, the fluid (carbon dioxide gas) below 1 MPa flows through the mixing bath 6A immediately after Timing T1, and the mixture of this fluid and the chemical agent A is created. The pressure inside the mixing bath 6A is then increased, whereby the high-pressure fluid at or beyond 1 MPa flows through the mixing bath 6A and the mixture of this high-pressure fluid and the chemical agent A (processing fluid A) is created. As the inside of the mixing bath 6A is pressurized to or over a critical pressure, the mixture of the chemical agent A and SCF (processing fluid A) is created as described above. When a mixing bath of the bubbler type (FIG. 6) described above is used as the mixing bath 6A, the mist-like chemical agent A could be mixed in the fluid as it is before becoming SCF, the high-pressure fluid, etc. To prevent supplying of the mist of the chemical agent A to a substrate, a mist separator may be disposed which removes the mist out from the mixture prior to supplying of the mixture to the substrate. As the mist separator, the one described in Japanese Patent Application Laid-Open Gazette No. 2003-100690 for example may be used.

Second Embodiment

By the way, in the first embodiment, SCF from the high-pressure pump 22 is supplied directly to the pressure vessel 1, the mixing baths 6A and 6B. Hence, it is difficult to accurately control the flow rate of SCF which is supplied to the pressure vessel 1, the mixing baths 6A and 6B. Noting this, the second embodiment described below adds flow rate control sections to the first embodiment, so as to accurately control the flow rate of SCF and achieve more favorable surface treatments.

Figure 8:
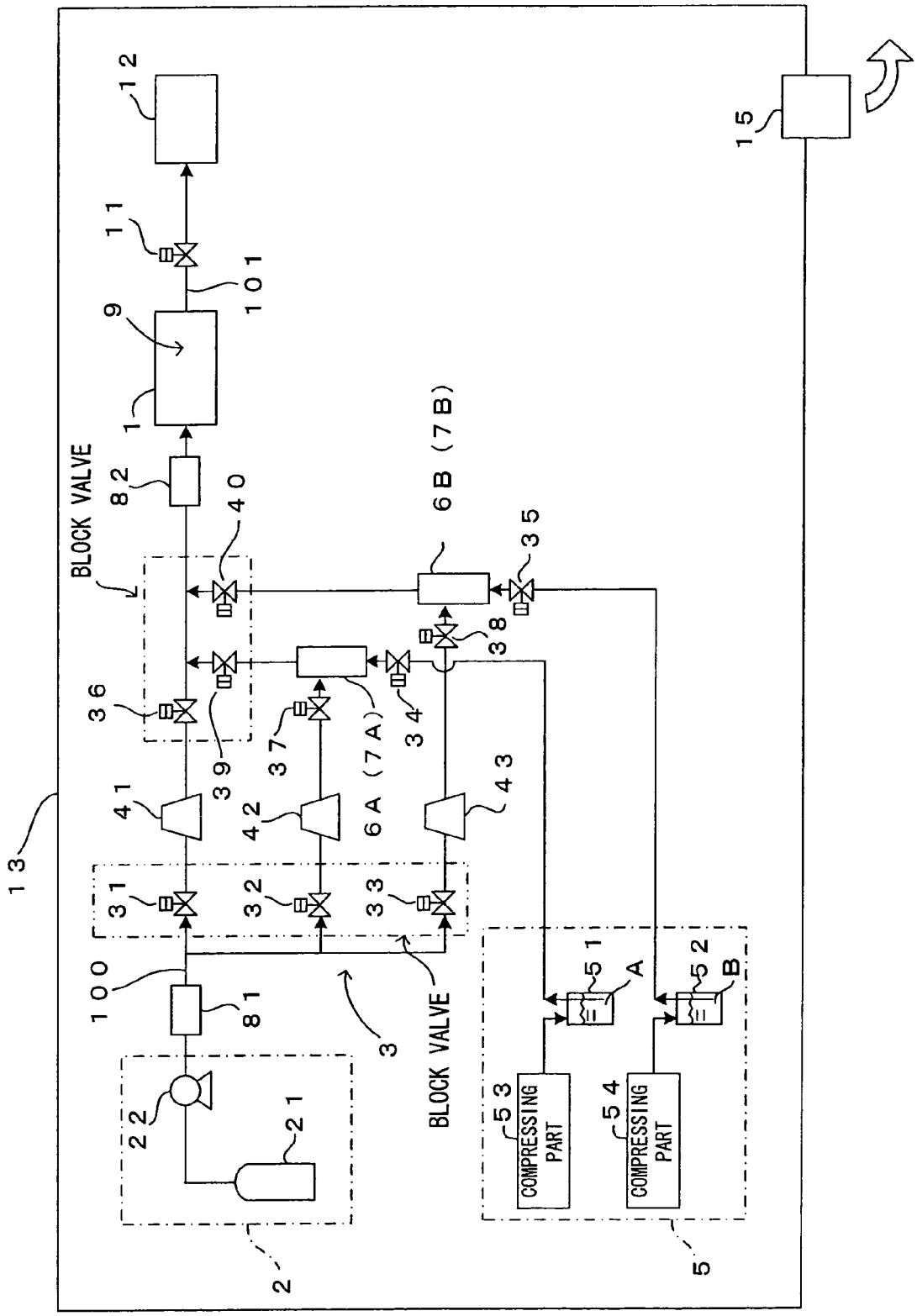
FIG. 8 is a drawing which shows a second embodiment of the high-pressure processing apparatus according to the present invention.

FIG. 8 is a drawing which shows the second embodiment of the high-pressure processing apparatus according to the present invention. A major difference of the second embodiment from the first embodiment is that there are flow rate control sections 41 through 43 disposed and high-pressure valves 31 through 33 newly disposed to the channel control unit 3 on the inlet side of the flow rate control sections. The second embodiment is otherwise basically similar to the first embodiment. Hence, the same structures will be denoted at the same reference symbols but will not be described. Characteristics of this embodiment will now be described, with a main focus on the difference.

The flow rate control sections may be flow rate controller such as mass flow controllers (hereinafter referred to as "MFC(s)"), and receive flow rate control signals from a controller (denoted at 200 in FIG. 9) for controlling the entire apparatus and accordingly control flow rates of SCF. The MFC 41 is interposed in the high-pressure pipe (first pipeline) 100 which connects the outlet side of the high-pressure pump 22 with the pressure vessel 1 through the first heater 81, the high-pressure valve 36 and the second heater 82, and is capable of controlling, in response to a flow rate command from the controller, the flow rate of SCF which is fed under pressure directly to the pressure vessel 1 from the high-pressure fluid supplying unit 2. The MFC 42 is interposed in a branch pipe (second pipeline) which extends from the outlet of the high-pressure pump 22, reaches the first heater 81, then branches and connects to the mixing bath 6A via the high-pressure valve 37. Hence, it is possible to control the flow rate of SCF which is fed under pressure to the mixing bath 6A from the high-pressure fluid supplying unit 2, in response to a flow rate command from the controller. The MFC 43 has a similar arrangement to the MFC 42. That is, the MFC 43 is interposed in the branch pipe (second pipeline) which extends from the outlet of the high-pressure pump 22, reaches the first heater 81, then branches and connects to the mixing bath 6B via the high-pressure valve 38, and is capable of controlling, in response to a flow rate command from the controller, the flow rate of SCF which is fed under pressure to the mixing bath 6B from the high-pressure fluid supplying unit 2. The high-pressure valves 31 through 33 are newly disposed immediately in front of the MFCs 41 through 43 respectively. The high-pressure valves 31 through 33 are formed integrally as one block valve.

Figure 9:
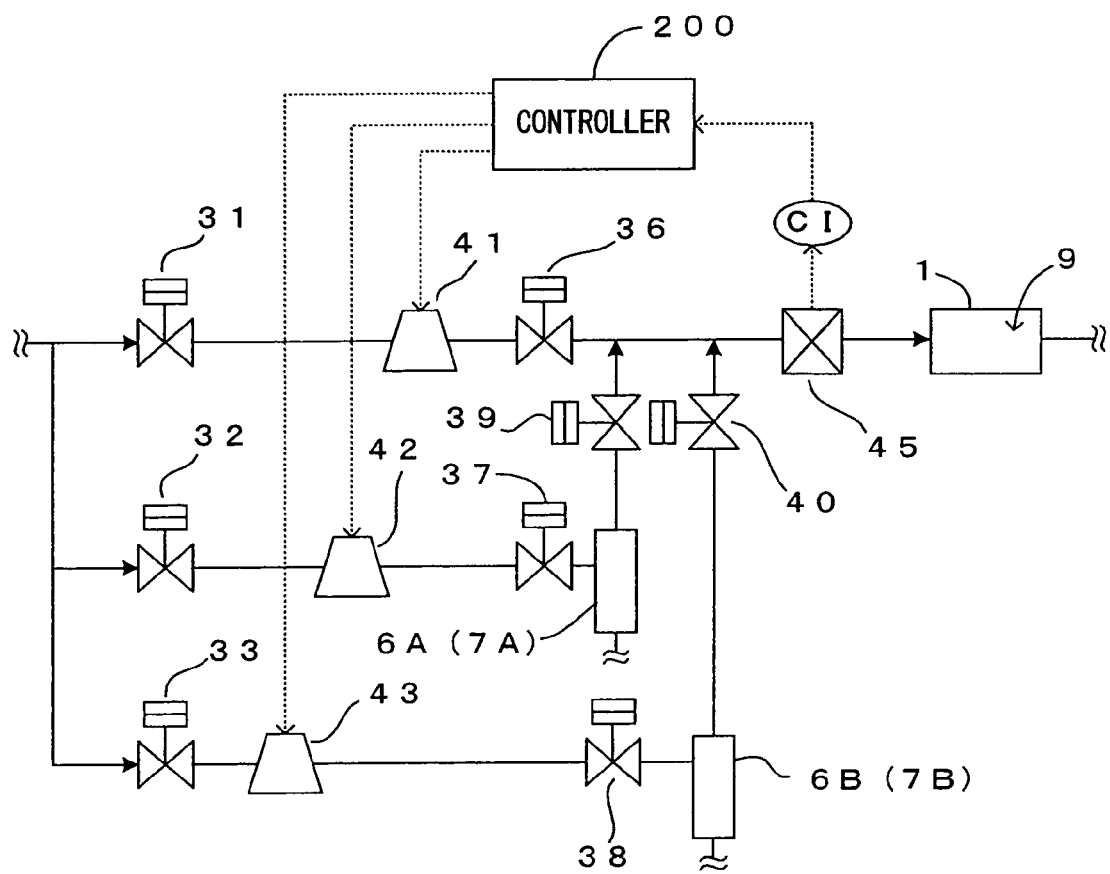
FIG. 9 is a partial structure view of the high-pressure processing apparatus which is shown in FIG. 8, showing control means which adjusts the concentration of a chemical agent.

FIG. 9 is a partial structure view of the high-pressure processing apparatus which is shown in FIG. 8, showing control means which adjusts the concentrations of the chemical agents. In this embodiment, in the vicinity of the inlet side of the pressure vessel 1, a concentration monitor 45 is newly interposed as chemical concentration sensing means in the high-pressure pipe (first pipeline) 100 which connects the high-pressure fluid supplying unit 2 with the pressure vessel 1 via the MFC 41. In the structure according to the second embodiment, as shown in FIG. 8, the high-pressure valves 39 and 40, which form a channel for the processing fluid toward the high-pressure pipe 100, and the high-pressure valve 36 which is interposed in the high-pressure pipe 100 are formed integrally as one integrated block valve. This ensures that (i) SCF alone, (ii) SCF+the chemical agent A or (iii) SCF+the chemical agent B flows into the concentration monitor 45 via this block valve. The chemical agent supply systems which feed the chemical agents A and B respectively from the mixing baths 6A and 6B to the pressure vessel 1 through the high-pressure valves (chemical agent introducing valves) 39 and 40 have the common structure. Feeding of the mixture of the chemical agent A and SCF as the processing fluid to the pressure vessel 1 will now be described with reference to the associated drawings, and feeding of the mixture of the chemical agent B and SCF as the processing fluid to the pressure vessel 1 will be denoted at the same or corresponding reference symbols but will not be described.

First, the MFC 41 is fully opened with the high-pressure valves 31 and 36 open, which initiates pressure feeding of SCF to the pressure vessel 1 from the high-pressure fluid supplying unit 2. The MFC 42 is thereafter fully opened with the high-pressure valves 32 and 37 open, so that a part of SCF fed under pressure to the pressure vessel 1 from the high-pressure fluid supplying unit 2 goes to the mixing bath 6A and the mixture of the chemical agent A and SCF (processing fluid A) is created. With the high-pressure valve (processing fluid introducing valve) 39 open, the processing fluid A reaches the pressure vessel 1 after flowing through the concentration monitor 45 which is disposed on the inlet side of the pressure vessel 1. The MFCs 41 and 42 are activated (under control) at this stage, thereby controlling the flow rate of the processing fluid A which is fed to the pressure vessel 1.

The concentration monitor 45 measures the chemical concentration of the processing fluid A and sends a concentration instruction (CI) signal to the controller. In the case of a discrepancy from a predetermined chemical concentration, receiving the CI signal, the controller sends the flow rate control signals to the MFCs 41 and 42 one after another in an attempt to achieve the predetermined chemical concentration, thus feed-back controlling the flow rates. In this manner, the chemical concentration of the processing fluid A fed to the pressure vessel 1 is accurately maintained constant. Further, a change of the flow rate command from the controller allows not only modification of the initially set chemical concentration (preset flow rate) but also accurate and required setting or modification of the chemical concentration in the line.

The operations of the high-pressure processing apparatus having such a structure above will now be described with reference to FIG. 10. The chemical agents A and B are introduced respectively to the mixing baths 6A and 6B as preparation for execution of surface treatments of a substrate, and this operation of introducing the chemical agents to the mixing baths is common to the operation which is shown in FIG. 4. Hence, surface treatments of a substrate after loading of the substrate to the processing chamber 9 will be described below. In this example, the order of executing the surface treatments of a substrate is similar to that in the first embodiment: a surface treatment using the mixture of the chemical agent A and SCF as the processing fluid, followed by a surface treatment using the mixture of the chemical agent B and SCF as the processing fluid, further followed by drying with SCF.

Figure 10:
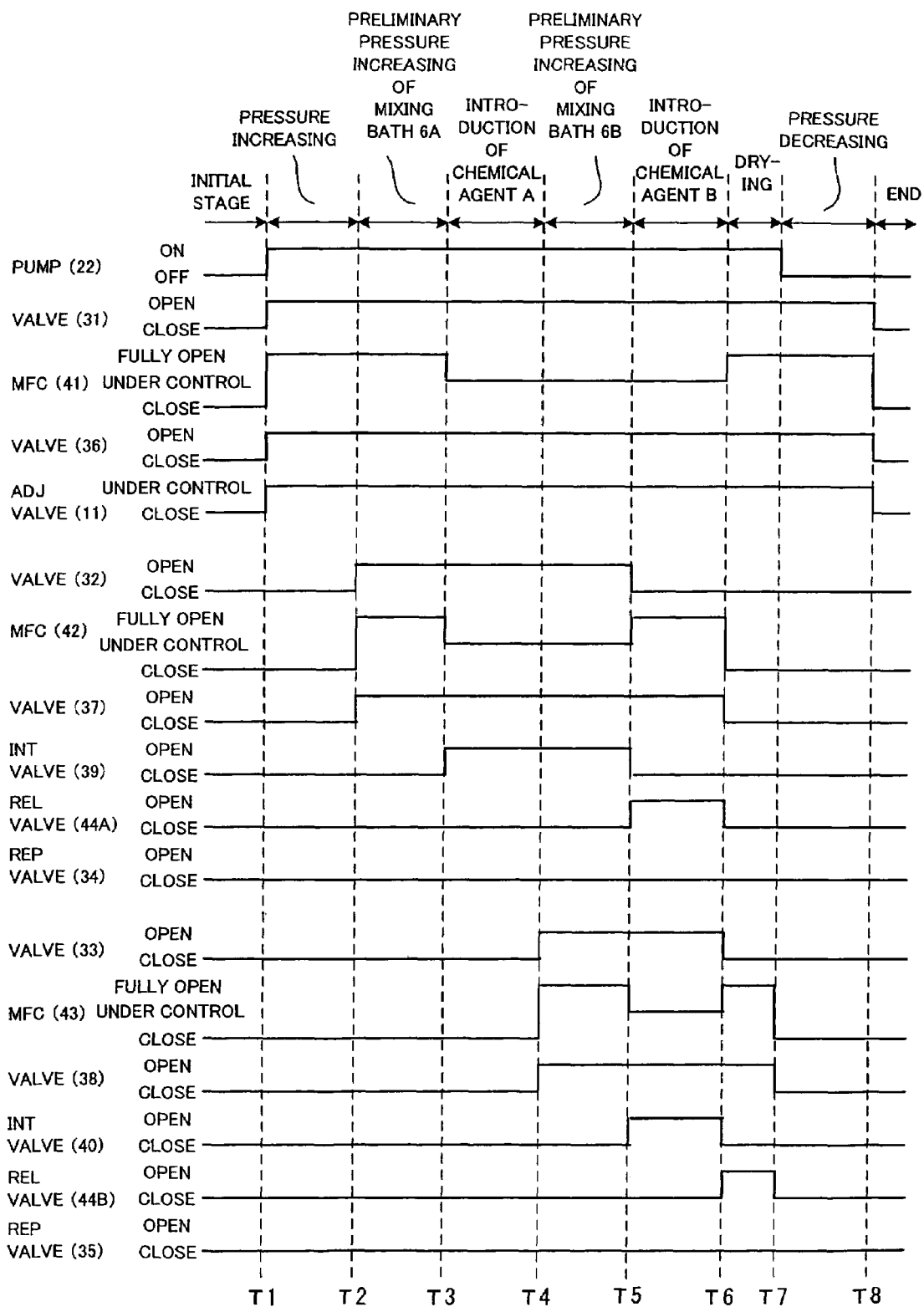
FIG. 10 is a timing chart which shows operations of substrate surface treatments within the high-pressure processing apparatus which is shown in FIG. 8.

FIG. 10 is a timing chart which shows the operations of the substrate surface treatments within the high-pressure processing apparatus which is shown in FIG. 8. At the initial stage, the high-pressure valves 31 through 40 and the MFCs 41 through 43 are all close (the flow is stopped) and the high-pressure pump 22 is in a halt condition. First, at Timing T1, the high-pressure valves 31 and 36 are opened and the MFC 41 is fully opened to make SCF ready for pressure feeding to the pressure vessel 1 from the high-pressure fluid supplying unit 2, and the high-pressure pump 22 is activated. This achieves pressure feeding of SCF to the pressure vessel 1, and the pressure inside the pressure vessel 1 gradually increases. With the pressure adjusting valve 11 opened or closed in response to an open/close command received from the controller at this stage, the pressure inside the pressure vessel 1 is kept constant. The pressure adjustment by means of this controlled opening/closing continues until decompression has completed. When it is necessary to adjust the temperature of the pressure vessel 1, a heater (not shown) disposed in the vicinity of the pressure vessel 1 sets the temperature to appropriate temperatures to the surface treatments.

Next, with the high-pressure valves 32 and 37 opened and the MFC 41 fully opened after the pressure vessel 1 has reached a predetermined pressure (Timing T2), a part of SCF fed under pressure from the high-pressure fluid supplying unit 2 to the pressure vessel 1 is branched and guided to the mixing bath 6A. In consequence, the pressure inside the mixing bath 6A rises preliminarily, which makes the chemical agent A held in the occupied reservoir area SR dissolve in SCF flowing into the empty reservoir area US and creates the mixture of the chemical agent A and SCF, namely, the processing fluid A.

With the high-pressure valve (processing fluid introducing valve) 39 opened at the next timing T3, the processing fluid A is sent into the pressure vessel 1. The MFCs 41 and 42 are activated (under control) at this stage, and the processing fluid A whose chemical concentration is adjusted is fed into the pressure vessel 1. This achieves the predetermined surface treatment of the substrate set inside the pressure vessel 1 using the mixture of the chemical agent A and SCF (processing fluid A).

Following this, the high-pressure valves 33 and 38 are opened and the MFC 43 is fully opened during the surface treatment of the substrate using the processing fluid A (Timing T4), and SCF fed under pressure from the high-pressure fluid supplying unit 2 toward the mixing bath 6A is partially branched out and introduced into the mixing bath 6B. This makes the chemical agent B held in the occupied reservoir area SR dissolve in SCF flowing into the empty reservoir area US of the mixing bath 6B, and creates the mixture of the chemical agent B and SCF, namely, the processing fluid B, which is ready to be supplied to the pressure vessel 1.

As the surface treatment of the substrate using the processing fluid A completes, the high-pressure valve 32 and the high-pressure valve (processing fluid introducing valve) 39 are closed to thereby stop supplying of the processing fluid A into the pressure vessel 1, and the MFC 42 is fully opened and the pressure relief valve 44A of the mixing bath 6A is opened to thereby release the pressure inside the mixing bath 6A to the reservoir 12 (Timing T5). The high-pressure valve (processing fluid introducing valve) 40 is then opened, thereby feeding the processing fluid B into the pressure vessel 1. The MFCs 41 and 43 are activated (under control) at this stage as in the case of the processing fluid A, the flow rate of SCF flowing into the mixing bath 6B is controlled and the concentration of the chemical agent contained in the processing fluid B is controlled. The processing fluid B whose chemical concentration is adjusted is thus fed into the pressure vessel 1. This achieves the predetermined surface treatment of the substrate set inside the pressure vessel 1 using the mixture of the chemical agent B and SCF (processing fluid B).

As the surface treatment of the substrate using the processing fluid B completes, the high-pressure valve 33 and the high-pressure valve (processing fluid introducing valve) 40 are closed to thereby stop supplying of the processing fluid B into the pressure vessel 1, and the MFC 43 is fully opened and the pressure relief valve 44B of the mixing bath 6B is opened to thereby release the pressure inside the mixing bath 6B to the reservoir 12. Meanwhile, the MFC 41 is fully opened, feeding SCF directly to the pressure vessel 1 from the high-pressure fluid supplying unit 2. This achieves drying of the substrate with SCF (Timing T6). After the pressure release of the mixing bath 6A, the high-pressure valve 37 and the pressure relief valve 44A are closed, and the MFC 42 is closed (the flow is stopped). Similarly as for the mixing bath 6B, after the pressure release, the high-pressure valve 38 and the pressure relief valve 44B are closed, and the MFC 43 is closed (the flow is stopped).

The high-pressure pump 22 is deactivated at Timing T7 and the pressure inside the pressure vessel 1 is accordingly decreased, and when the pressure returns to a normal pressure (Timing T8), the pressure adjusting valve 11 and the high-pressure valves 31 and 36 are closed and the MFC 41 is closed (the flow is stopped), which completes the surface treatments of the substrate.

Upon completion of the surface treatments of the substrate, the transportation mechanism unloads thus processed substrate out from the processing chamber 9. The process below then follows, as in the first embodiment. That is, in the event that the amount of the chemical agent inside the mixing bath (the height level of the chemical agent) is at or beyond a predetermined value, the next substrate yet to be processed is loaded in the processing chamber 9 and the series of the surface treatments of the substrate is executed. On the other hand, when the amount of the chemical agent inside the mixing bath (the height level of the chemical agent) is below the predetermined value, the surface treatments of the substrate are executed after the process of introducing the chemical agent into the mixing bath.

As described above, the second embodiment attains similar effects to those according to the first embodiment since utilizing the force of pressure feeding SCF, the mixtures of the chemical agents and SCF (processing fluids) are created inside the mixing baths and the processing fluids are fed into the pressure vessel 1. In addition, since the additionally disposed MFCs permit control of the flow rate of SCF at each timing in the second embodiment, it is possible to highly accurately control the concentrations of the chemical agents contained in the processing fluids and realize more favorable surface treatments.

In general, a mass flow controller (MFC) is comprised of a mass flow meter and a mechanism which adjusts the flow rate based on a detection value recorded by the mass flow meter, e.g., a mechanism which is equipped with an on-off valve and changes an on-off duty ratio of the on-off valve. Alternatively, the flow rate controller may be on-off valves which can switch between a "fully-open state," a "state restricting to a certain flow rate" and a "fully-close state" instead of MFCs, and the "state restricting to a certain flow rate" state may be selected as the "under control" state described above. In this case, flowmeters may be disposed as needed to the respective pipes so as to monitor the flow rates in these pipes.

Figure 11:
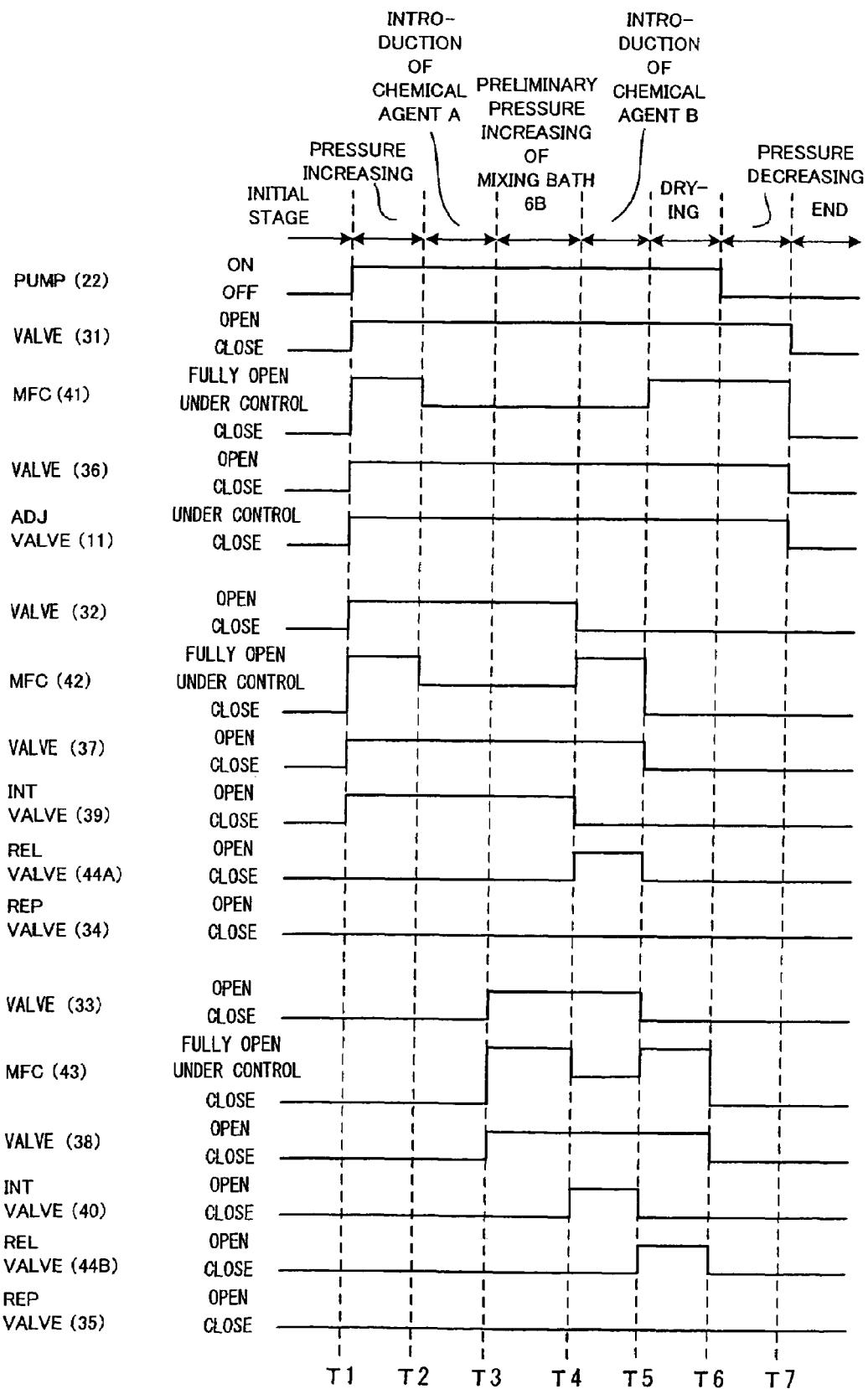
FIG. 11 is a timing chart which shows a modification of the high-pressure processing apparatus according to the second embodiment.

FIG. 11 is a timing chart which shows the operations of other substrate surface treatments within the high-pressure processing apparatus which is shown in FIG. 8. In the illustrated example, as in the modification of the first embodiment (FIG. 7), a change of the timing of opening or closing the high-pressure valves initiates the surface treatment of a substrate using the processing fluid A immediately after activation of the high-pressure pump. In short, the high-pressure pump 22 is activated and the MFCs 41 and 42 are opened (fully opened) at Timing T1 and the high-pressure valves 31, 32, 36 and 37 and the high-pressure valve (processing fluid introducing valve) 39 are then opened, thereby pressure feeding SCF to the pressure vessel 1 from the high-pressure fluid supplying unit 2. This makes the chemical agent A dissolve in SCF flowing into the mixing bath 6A and creates the mixture of the chemical agent A and SCF (processing fluid A), and the processing fluid A is fed to the pressure vessel 1. The pressure inside the pressure vessel 1 consequently rises, and the surface treatment of the substrate using the processing fluid A takes place concurrently. The operations which follow are similar to those of the substrate surface treatment shown in FIG. 10. In the case of the substrate surface treatment shown in FIG. 11, the surface treatment of a substrate with the processing fluid A starts immediately after activation of the high-pressure pump, and hence, the substrate processing time shortens and it is possible to improve the throughput per substrate of the substrate processing.

More strictly describing, the pressure inside the pipe from the high-pressure pump 22 to the mixing bath 6A and inside the mixing bath 6A do not rise sufficiently during a period of pressurizing the pressure vessel 1 from Timing T1 to Timing T2, and there is a predetermined period during which the pressure is less than a critical pressure. Hence, the fluid (carbon dioxide gas) below 1 MPa flows through the mixing bath 6A immediately after Timing T1, and the mixture of this fluid and the chemical agent A is created. The pressure inside the mixing bath 6A is then increased, whereby the high-pressure fluid at or beyond 1 MPa circulates in the mixing bath 6A and the mixture of this high-pressure fluid and the chemical agent A (processing fluid A) is created. As the inside of the mixing bath 6A is pressurized to or over a critical pressure, the mixture of the chemical agent A and SCF (processing fluid A) is created as described above. When a mixing bath of the bubbler type (FIG. 6) described above is used as the mixing bath 6A, the mist-like chemical agent A could be mixed in the fluid as it is before becoming SCF, the high-pressure fluid, etc. To prevent supplying of the mist of the chemical agent A to a substrate, a mist separator may be disposed which removes the mist out from the mixture prior to supplying of the mixture to the substrate. As the mist separator, the one described in Japanese Patent Application Laid-Open Gazette No. 2003-100690 for example may be used.

Third Embodiment

Although the first and the second embodiments described above demand that the processing fluids are created in the mixing baths 6A and 6B and thereafter fed into the pressure vessel 1, a part of SCF from the high-pressure pump 22 may be used while running SCF from the high-pressure pump 22 in the high-pressure pipe (first pipeline) 100, to thereby feed the chemical agents in SCF inside the high-pressure pipe 100.

In the high-pressure processing apparatus according to the third embodiment, for the purpose of sending the chemical agents A and B using the force of pressure feeding SCF from the high-pressure fluid supplying unit 2, intermediate baths 7A and 7B are disposed.

FIG. 12 is a drawing which shows the structure of the intermediate baths disposed in the high-pressure processing apparatus according to the third embodiment. The intermediate baths 7A and 7B have a common structure. Therefore, the structure and operations of the intermediate bath 7A will be described in detail with reference to FIG. 12, and the structure and operations of the intermediate bath 7B will be denoted at the same or corresponding reference symbols but will not be described. Those reference symbols in parentheses in FIG. 12 are reference symbols assigned to the intermediate bath 7B.

As shown in FIG. 12, the intermediate bath 7A internally has a reservoir space in which it is possible to hold a chemical agent. A pipe seating the chemical agent replenishing valve (high-pressure valve) 34 is connected to a ceiling portion of the intermediate bath 7A, which allows feeding of the chemical agent A from the chemical agent supplying unit 5 to the bottom of the reservoir space from the ceiling side of the intermediate bath 7A. An upper side portion of the intermediate bath 7A is connected to the high-pressure fluid supplying unit 2 via the high-pressure valve 37, and as the high-pressure valve 37 opens and closes in response to an open/close command received from the controller, SCF is fed at the timing which will be described later to an upper portion of the reservoir space. Further, the pipe partially branches out, and the pressure relief valve 44A is interposed in this branch pipe. In this manner, it is possible to supply SCF to the intermediate bath 7A and compress the chemical agent which is held in the occupied reservoir area SR. For the purpose of pressure feeding of thus compressed the chemical agent A toward the pressure vessel 1, one end of a pipe seating the high-pressure valve 39 is inserted to the occupied reservoir area SR of the intermediate bath 7A.

The intermediate bath 7A having such a structure sends out the chemical agent A toward the pressure vessel 1, according to the following procedure. The procedure of supplying (replenishing) the chemical agent A to the intermediate bath 7A is similar to that for the mixing baths. That is, the pressure relief valve 44A is opened at the initial stage (a condition that the high-pressure valves are all close) and the pressure inside the intermediate bath 7A is released to the reservoir 12. This is followed by opening of the chemical agent replenishing valve 34 and consequent supplying of the chemical agent A to the intermediate bath 7A from the chemical agent supplying unit 5. After supplying (replenishing) a predetermined amount of the chemical agent A, the pressure relief valve 44A and the chemical agent replenishing valve 34 are closed, whereby supplying (replenishment) of the chemical agent to the intermediate bath 7A completes. In this embodiment, instead of supplying or replenishing the chemical agent A to the entire reservoir space inside the intermediate bath 7A, the chemical agent A is held in the reservoir space leaving an upper portion of the reservoir space empty. Hence, as shown in FIG. 12, the empty reservoir area US of the reservoir space communicates with the high-pressure fluid supplying unit 2 via the high-pressure valve 37. For this reason, as the high-pressure valve 37 is opened, a flow of SCF from the high-pressure fluid supplying unit 2 flows into the empty reservoir area US and the chemical agent A held in the occupied reservoir area SR is compressed. The chemical agent A thus compressed in accordance with opening of the high-pressure valve 39, which is interposed in a pipe (third pipeline) which connects the intermediate bath 7A with the pressure vessel 1, is therefore fed into the pressure vessel 1. The flow of SCF sent into the empty reservoir area US thus functions as means which feeds under pressure the chemical agent A to the pressure vessel 1. As the flow rate of SCF fed under pressure to the intermediate bath 7A is controlled therefore, the concentration of the chemical agent A fed into the pressure vessel 1 is adjusted appropriately. Intermediate baths of this type will be herein referred to as "intermediate baths of SCF compressing type."

The high-pressure processing apparatus according to the third embodiment is otherwise the same in structure as the second embodiment. The same structures will be denoted at the same reference symbols but will not be described.

The operations in the high-pressure processing apparatus having the structure above will now be described with reference to FIGS. 3 and 13. In this high-pressure processing apparatus, the chemical agents A and B are introduced respectively to the intermediate baths 7A and 7B at Step S1 shown in FIG. 3, as preparation for execution of surface treatments of a substrate. The operation of introducing the chemical agents to the intermediate baths is common to the operation which is shown in FIG. 4.

After loading of a substrate into the processing chamber 9 at Step S2, as in the first and the second embodiments, the substrate is subjected to a surface treatment using the mixture of the chemical agent A and SCF as the processing fluid, a surface treatment using the mixture of the chemical agent B and SCF as the processing fluid, and drying with SCF in this order (Step S3).

Figure 13:
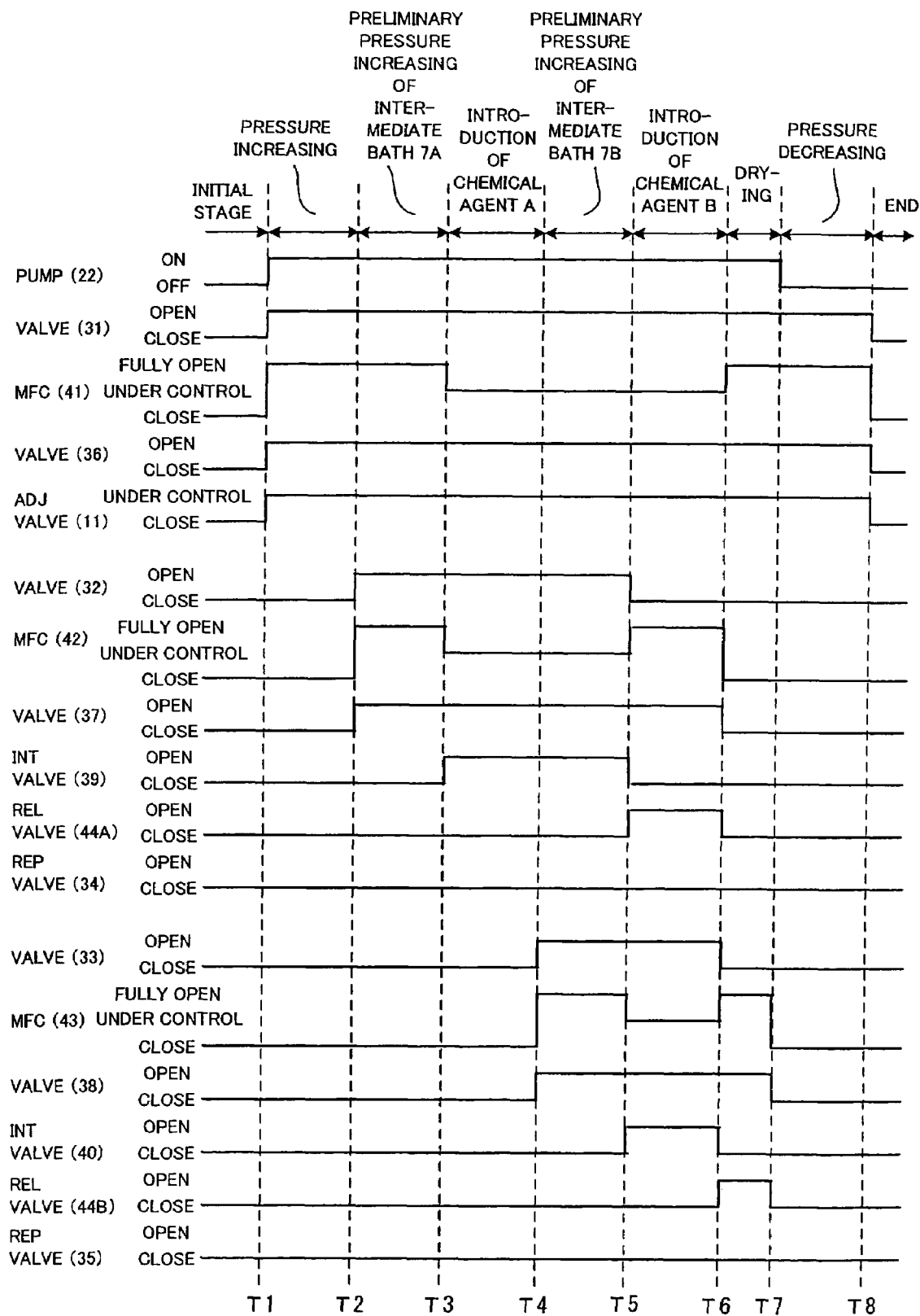
FIG. 13 is a timing chart which shows operations of surface treatments within the high-pressure processing apparatus according to the third embodiment.

FIG. 13 is a timing chart which shows operations of surface treatments within the high-pressure processing apparatus according to the third embodiment. At the initial stage, the high-pressure valves 31 through 40 and the MFCs 41 through 43 are all close (the flow is stopped) and the high-pressure pump 22 is in a halt condition. First, at Timing T1, the high-pressure valves 31 and 36 are opened and the MFC 41 is fully opened to make SCF ready for pressure feeding to the pressure vessel 1 from the high-pressure fluid supplying unit 2, and the high-pressure pump 22 is activated. This achieves pressure feeding of SCF to the pressure vessel 1, and the pressure inside the pressure vessel 1 gradually increases. With the pressure adjusting valve 11 opened or closed in response to an open/close command received from the controller at this stage, the pressure inside the pressure vessel 1 is kept constant. The pressure adjustment by means of this controlled opening/closing continues until decompression has completed. When it is necessary to adjust the temperature of the pressure vessel 1, a heater (not shown) disposed in the vicinity of the pressure vessel 1 sets the temperature to appropriate temperatures to the surface treatments.

Next, with the high-pressure valves 32 and 37 opened and the MFC 42 fully opened after the pressure vessel 1 has reached a predetermined pressure (Timing T2), a part of SCF fed under pressure from the high-pressure fluid supplying unit 2 to the pressure vessel 1 is branched and guided to the intermediate bath 7A. In consequence, SCF flowing into the empty reservoir area US inside the intermediate bath 7A compresses the chemical agent A which is held in the occupied reservoir area SR, and the chemical agent A is made ready for pressure feeding to the pressure vessel 1.

With the high-pressure valve (chemical agent introducing valve) 39 opened at the next timing T3, the processing fluid A is mixed at the joint section with SCF which is fed under pressure to the pressure vessel 1 from the high-pressure fluid supplying unit 2. The MFCs 41 and 42 are activated (under control) at this stage, and SCF and the chemical agent A are fed into the pressure vessel 1 each at a controlled flow rate. This achieves the predetermined surface treatment of the substrate set inside the pressure vessel 1 using the mixture of the chemical agent A and SCF (processing fluid A).

Following this, the high-pressure valves 33 and 38 are opened and the MFC 43 is fully opened during the surface treatment of the substrate with the processing fluid A (Timing T4), and SCF fed under pressure to the pressure vessel 1 from the high-pressure fluid supplying unit 2 is partially branched out and introduced into the intermediate bath 7B. In consequence, SCF flowing into the empty reservoir area US inside the intermediate bath 7B compresses the chemical agent B which is held in the occupied reservoir area SR, and the chemical agent B is made ready for pressure feeding to the pressure vessel 1.

As the surface treatment of the substrate with the processing fluid A completes, the high-pressure valve 32 and the high-pressure valve (chemical agent introducing valve) 39 are closed to thereby stop supplying of the processing fluid A into the pressure vessel 1, and the MFC 42 is fully opened and the pressure relief valve 44A of the intermediate bath 7A is opened to thereby release the pressure inside the intermediate bath 7A to the reservoir 12 (Timing T5). The high-pressure valve (chemical agent introducing valve) 40 is then opened, the processing fluid B is mixed at the joint section with SCF which is fed under pressure to the pressure vessel 1 from the high-pressure fluid supplying unit 2. The MFC 43 activated (under control) at this stage (with the MFC 41 kept operating), and SCF and the chemical agent B are fed into the pressure vessel 1 each at a controlled flow rate. This achieves the predetermined surface treatment of the substrate set inside the pressure vessel 1 using the mixture of the chemical agent B and SCF (processing fluid B).

As the surface treatment of the substrate using the processing fluid B completes, the high-pressure valve 33 and the high-pressure valve (processing fluid introducing valve) 40 are closed to thereby stop supplying of the processing fluid B into the pressure vessel 1, and the MFC 43 is fully opened and the pressure relief valve 44B of the intermediate bath 7B is opened to thereby release the pressure inside the intermediate bath 7B to the reservoir 12. Supplying to the pressure vessel 1 is still ongoing at this stage, and therefore, with the MFC 41 fully open, drying of the substrate with SCF is realized (Timing T6). After the pressure release of the intermediate bath 7A, the high-pressure valve 37 and the pressure relief valve 44A are closed, and the MFC 42 is closed (the flow is stopped). Similarly as for the intermediate bath 7B, after the pressure release, the high-pressure valve 38 and the pressure relief valve 44B are closed, and the MFC 43 is closed (the flow is stopped).

The high-pressure pump 22 is deactivated at Timing T7 and the pressure inside the pressure vessel 1 is accordingly decreased, and when the pressure returns to a normal pressure (Timing T8), the pressure adjusting valve 11 and the high-pressure valves 31 and 36 are closed and the MFC 41 is closed (the flow is stopped), which completes the surface treatments of the substrate.

Upon completion of the surface treatments of the substrate, the transportation mechanism unloads thus processed substrate out from the processing chamber 9. The process below then follows, as in the first embodiment. That is, in the event that the amount of the chemical agent inside the intermediate bath (the height level of the chemical agent) is at or beyond a predetermined value, the next substrate yet to be processed is loaded in the processing chamber 9 and the series of the surface treatments of the substrate is executed. On the other hand, when the amount of the chemical agent inside the intermediate bath (the height level of the chemical agent) is below the predetermined value, the surface treatments of the substrate are executed after the process of introducing the chemical agent into the intermediate bath.

As described above, the third embodiment attains similar effects to those according to the first and the second embodiments since a part of SCF fed under pressure to the pressure vessel 1 from the high-pressure fluid supplying unit 2 is sent into the intermediate bath which already holds the chemical agent and the chemical agent is added to a flow of SCF flowing through the high-pressure pipe (first pipeline) 100. In other words, since the chemical agent is supplied utilizing the force of pressure feeding SCF, it is not necessary to dispose a high-pressure pump dedicated only to supplying of the chemical agent, thereby simplifying the apparatus more than conventional apparatuses and reducing costs more. To be particularly noted, it is not necessary to dispose a high-pressure pump each for each chemical agent in such an instance that multiple types of chemical agents are to be used in an effort to enhance the versatility and the capabilities of the apparatus, which is remarkably effective. Further, omission of such high-pressure pumps makes it possible to prevent leakage of the chemical agents which would otherwise occur owing to deterioration of the durability of plunger seals. Further, it is possible to reduce inclusion of particles created by sliding of plungers in the processing fluids and realize favorable surface treatments of substrates. Further, since the MFCs permit control of the flow rate of SCF at each timing, it is possible to highly accurately control the concentrations of the chemical agents mixed in SCF and realize more favorable surface treatments.

Fourth Embodiment

Figure 14:
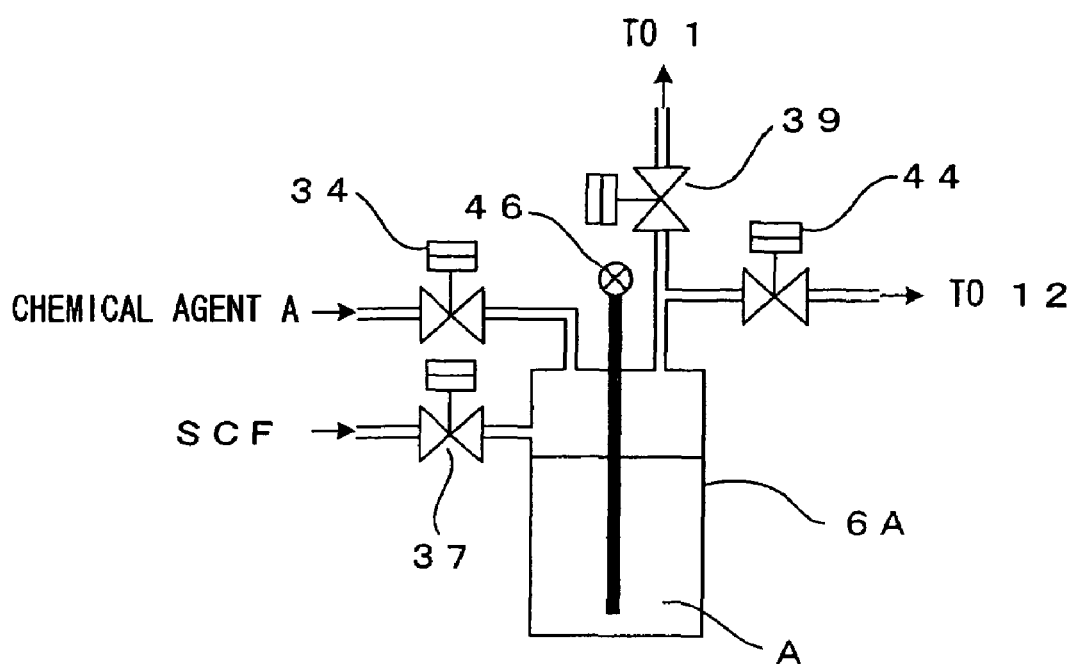
FIG. 14 is a drawing which shows a fourth embodiment of the high-pressure processing apparatus according to the present invention.

FIG. 14 is a drawing which shows a fourth embodiment of the high-pressure processing apparatus according to the present invention. The fourth embodiment uses a level sensor (chemical level sensing means) 46 which senses the height levels of the chemical agents inside the mixing baths 6A and 6B and the intermediate baths 7A and 7B. It is only the level sensor 46 disposed to the mixing bath 6A that is shown in FIG. 14, and sensing of the height level of the chemical agent inside the mixing bath 6A and an associated replenishing operation will be described below: However, other mixing bath and the intermediate baths are also equipped with the level sensors 46 of the same structure for execution of similar replenishing operations.

The level sensor 46 bears a plurality of pressure sensors (not shown) along a rod-shaped member which extends in the height direction. Each pressure sensor is capable of outputting a signal which corresponds to whether there is the chemical agent or not. The level sensor 46 is electrically connected with the controller which controls the entire apparatus, and is capable of outputting to the controller the signals received from the respective pressure sensors. Based on these signals, the controller can calculate the height level of the chemical agent A held inside the mixing bath 6A and accurately calculate the amount of the chemical agent A from the height level. Further, when the height level sensed by the level sensor 46 becomes equal to or less than a predetermined supply level, the controller makes the chemical agent supplying unit 5 supply the chemical agent A to the mixing bath 6A and accordingly controls the amount of the chemical agent A inside the mixing bath 6A in an accurate manner. As a result, the desired mixture (processing fluid) is created without fail inside the mixing bath 6A.

Alternatively, when the height level sensed by the level sensor 46 reaches a predetermined end level, the controller may control the respective portions of the apparatus to thereby terminate the surface treatment of the article-to-be-processed with the chemical agent. The controller thus functions as the "control device" of the present invention which precisely controls the progress of the surface treatment.

While the height level of the chemical agent is calculated by the pressure method, other method such as an optical method and a capacitance method may be used for calculation of the height level of the chemical agent.

Fifth Embodiment

Figure 15:
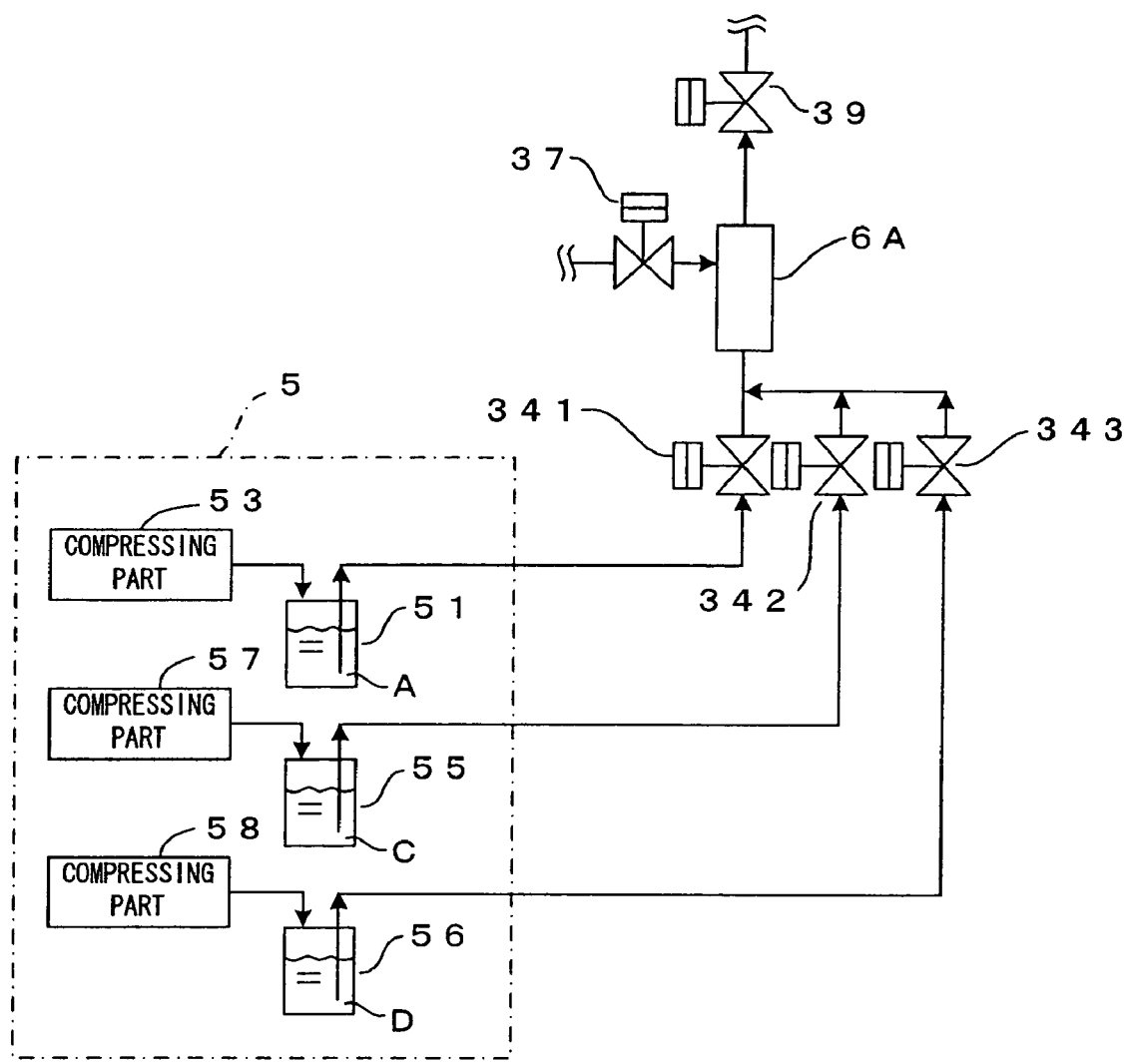
FIG. 15 is a drawing which shows a fifth embodiment of the high-pressure processing apparatus according to the present invention.

FIG. 15 is a drawing which shows a fifth embodiment of the high-pressure processing apparatus according to the present invention. A major difference of the fifth embodiment from the earlier embodiments is that a plurality types of chemical agents A, C and D which are different from each other can be supplied to the mixing bath 6A. In this embodiment, the chemical agent supplying unit 5 comprises chemical agent supply systems which are for supplying the chemical agents A, C and D to the mixing bath 6A. In other words, a compressing part 53 is connected to the reservoir tank 51 which holds the chemical agent A and the reservoir tank 51 is connected to the mixing bath 6A via a high-pressure valve 341, as the chemical agent supply system for supplying the chemical agent A. Further, as the chemical agent supply system for supplying the chemical agent C, a compressing part 57 is connected to a reservoir tank 55 which holds the chemical agent C and the reservoir tank 55 is connected to the mixing bath 6A via a high-pressure valve 342. Still further, as the chemical agent supply system for supplying the chemical agent D, a compressing part 58 is connected to a reservoir tank 56 which holds the chemical agent D and the reservoir tank 56 is connected to the mixing bath 6A via a high-pressure valve 343. Hence, as opening and closing of the high-pressure valves 341 through 343 is controlled in accordance with an open/close command received from the controller, all or some of the chemical agents A, C and D are selectively supplied to the mixing bath 6A. Thus, in this embodiment, a surface treatment using a plurality types of chemical agents is possible and the versatility of the high-pressure processing apparatus further improves. This embodiment may be applied to the mixing bath 6B or the intermediate baths 7A and 7B, instead of applying this embodiment to the mixing bath 6A.

The present invention is not limited to the preferred embodiments above, but may be modified in various manners besides the preferred embodiments above to the extent not deviating from the spirit of the invention. For instance, although the two baths (such as mixing baths and intermediate baths) which temporarily hold the chemical agents are used in the embodiments above, the number of these baths is not limited to two but may be any desired number. In addition, the types of the chemical agents for the surface treatments may be any desired types.

Further, while the foregoing has described the present invention in relation to a high-pressure processing apparatus which executes a surface treatment using the processing fluid A and a surface treatment using the processing fluid B in this order, the present invention is applicable also to an apparatus which executes either one of these surface treatments and an apparatus which simultaneously executes the surface treatments using the both processing fluids A and B.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A high-pressure processing apparatus in which a mixture of a high-pressure fluid and a chemical agent is brought as a processing fluid into contact with a surface of an article-to-be-processed and the surface of said article-to-be-processed is subjected to a predetermined surface treatment, comprising:

a pressure vessel which internally includes a processing chamber which is for executing said surface treatment;

a high-pressure fluid supplier which pressure-feeds said high-pressure fluid towards said pressure vessel;

a mixing bath which internally includes a reservoir space in a part of which said chemical agent is held;

a chemical agent supplier which supplies said chemical agent to said mixing bath;

a reservoir which communicates with said pressure vessel and to which the processing fluid inside said pressure vessel is discharged;

a first pipe which connects said high-pressure fluid supplier with said mixing bath;

a second pipe which connects said mixing bath with said pressure vessel, the second pipe being connected to said mixing bath such that an empty reservoir area of said reservoir space in which said chemical agent is not present is communicated with said pressure vessel;

a third pipe which communicates said mixing bath with said reservoir and in which a pressure relief valve is interposed; and a channel control system which controls a channel of said high-pressure fluid pressure-fed from said high-pressure fluid supplier toward said pressure vessel, wherein said channel control system guides said high-pressure fluid pressure-fed from said high-pressure fluid supplier to said mixing bath which holds said chemical agent supplied from said chemical agent supplier via said first pipe, thereby creating said mixture inside said mixing bath, and said channel control system guides said mixture from said mixing bath to said pressure vessel via said second pipe.

2. The high-pressure processing apparatus of claim 1, wherein said first pipe is connected to said mixing bath such that said empty reservoir area is communicated with said high-pressure fluid supplier, and inside said mixing bath, said chemical agent held in said reservoir space dissolves in said high-pressure fluid flowing in said empty reservoir area and said mixture is created, and said mixture is sent toward said pressure vessel.

3. The high-pressure processing apparatus of claim 1, wherein said first pipe is connected to said mixing bath such that an occupied reservoir area of said reservoir space in which said chemical agent is held communicates with said high-pressure fluid supplier, and inside said mixing bath, said chemical agent dissolves in said high-pressure fluid flowing in said occupied reservoir area and said mixture is created, and said mixture is sent toward said pressure vessel.

4. The high-pressure processing apparatus of claim 1, further comprising a chemical level sensor which senses the height level of said chemical agent which is held within said reservoir space.

5. The high-pressure processing apparatus of claim 4, wherein when the height level sensed by said chemical level sensor is equal to or less than a predetermined supply level, said chemical agent supplier supplies said chemical agent to said mixing bath.

6. The high-pressure processing apparatus of claim 4, further comprising a control device which controls the respective portions of the apparatus to thereby terminate said surface treatment of said article-to-be-processed with said chemical agent when the height level sensed by said chemical level sensor reaches a predetermined end level.

7. The high-pressure processing apparatus of claim 1, wherein said chemical agent supplier supplies all or some of chemical agents which are different from each other to said mixing bath.

8. The high-pressure processing apparatus of claim 1, wherein a toxic substance is used as said chemical agent, and
sections of the high-pressure processing apparatus which could leak said toxic substance are housed inside a sealed structure which comprises an exhausting device.

9. A high-pressure processing apparatus in which a mixture of a high-pressure fluid and a chemical agent is brought as a processing fluid into contact with a surface of an article-to-be-processed and the surface of said article-to-be-processed is subjected to a predetermined surface treatment, comprising:
a pressure vessel which internally includes a processing chamber which is for executing said surface treatment;
a high-pressure fluid supplier which pressure-feeds said high-pressure fluid toward said pressure vessel;
an intermediate bath which internally includes a reservoir space in which it is possible to hold said chemical agent;
a chemical agent supplier which supplies said chemical agent to said intermediate bath;
a first pipeline which connects said high-pressure fluid supplier with said pressure vessel;
a second pipeline which connects said high-pressure fluid supplier with said intermediate bath;
a third pipeline which connects said intermediate bath with said pressure vessel;
a channel control system which controls a channel of said high-pressure fluid pressure-fed from said high-pressure fluid supplier toward said pressure vessel,
wherein said channel control system guides a part of said high-pressure fluid from said high-pressure fluid supplier to said pressure vessel via said first pipeline, guides a rest of said high-pressure fluid to said intermediate bath which holds said chemical agent supplied from said chemical agent supplier via said second pipeline, whereby said chemical agent held in said intermediate bath is guided to said pressure vessel via said third pipeline,
a reservoir which communicates with said pressure vessel and to which the processing fluid inside said pressure vessel is discharged, and
a fourth pipeline which communicates said intermediate bath with said reservoir and in which a pressure relief valve is interposed.

10. The high-pressure processing apparatus of claim 9, wherein said channel control system includes a flow rate control section which controls a flow ratio of said high-pressure fluid which flows in said first pipeline and said second pipeline.

11. The high-pressure processing apparatus of claim 10, further comprising:
a chemical concentration sensor which senses the concentration of said chemical agent which flows into said pressure vessel; and
a controller which controls said flow rate control section based on the chemical concentration sensed by said chemical concentration sensor and adjusts the chemical concentration within said pressure vessel.

12. The high-pressure processing apparatus of claim 9, wherein said high-pressure fluid is fed under pressure to said intermediate bath while said chemical agent is held in a part of said reservoir space,
an empty reservoir area of said reservoir space in which said chemical agent is not present communicates with said high-pressure fluid supplier via said second pipeline and said pressure vessel via said third pipeline, and
inside said intermediate bath, said chemical agent held in said reservoir space dissolves in said high-pressure fluid flowing in said empty reservoir area and said mixture is created, and said mixture is sent toward said pressure vessel.

13. The high-pressure processing apparatus of claim 9, wherein said high-pressure fluid is fed under pressure to said intermediate bath while said chemical agent is held in a part of said reservoir space,
an occupied reservoir area of said reservoir space in which said chemical agent is held communicates with said high-pressure fluid supplier via said second pipeline while an empty reservoir area in which said chemical agent is not present communicates with said pressure vessel via said third pipeline, and
inside said intermediate bath, said chemical agent dissolves in said high-pressure fluid flowing in said occupied reservoir area and said mixture is created, and said mixture is sent toward said pressure vessel.

14. The high-pressure processing apparatus of claim 9, wherein said high-pressure fluid is fed under pressure to said intermediate bath while said chemical agent is held in a part of said reservoir space,
an empty reservoir area of said reservoir space in which said chemical agent is not present communicates with said high-pressure fluid supplier via said second pipeline while an occupied reservoir area in which said chemical agent is held communicates with said pressure vessel via said third pipeline, and
said high-pressure fluid flowing into said empty reservoir area pushes out said chemical agent from said intermediate bath toward said pressure vessel.

15. The high-pressure processing apparatus of claim 9, further comprising a chemical level sensor which senses the height level of said chemical agent which is held within said reservoir space.

16. The high-pressure processing apparatus of claim 15, wherein when the height level sensed by said chemical level sensor is equal to or less than a predetermined supply level, said chemical agent supplier supplies said chemical agent to said intermediate bath.

17. The high-pressure processing apparatus of claim 15, further comprising a control device which controls the respective portions of the apparatus to thereby terminate said surface treatment of said article-to-be-processed with said chemical agent when the height level sensed by said chemical level sensor reaches a predetermined end level.

18. The high-pressure processing apparatus of claim 9, wherein said chemical agent supplier supplies all or some of chemical agents which are different from each other to said intermediate bath.

19. The high-pressure processing apparatus of claim 9, wherein a toxic substance is used as said chemical agent, and sections of the high-pressure processing apparatus which could leak said toxic substance are housed inside a sealed structure which comprises an exhausting device.

* * * * *